US008341658B2

(12) United States Patent
Nakanishi et al.

(10) Patent No.: US 8,341,658 B2
(45) Date of Patent: Dec. 25, 2012

(54) TURNTABLE FOR A STORAGE DISK DRIVE APPARATUS, A MOTOR USING THE TURNTABLE, A STORAGE DISK DRIVE APPARATUS USING THE SAME

(75) Inventors: Kosuke Nakanishi, Kyoto (JP); Shinya Tabata, Kyoto (JP); Toshihide Sonoda, Kyoto (JP); Yoshihisa Kitamura, Kyoto (JP)

(73) Assignee: Nidec Corporation, Kyoto (JP)

( * ) Notice: Subject to any disclaimer, the term of this patent is extended or adjusted under 35 U.S.C. 154(b) by 267 days.

(21) Appl. No.: 12/796,080

(22) Filed: Jun. 8, 2010

(65) Prior Publication Data

US 2010/0309588 A1 Dec. 9, 2010

(30) Foreign Application Priority Data

Jun. 8, 2009 (JP) ................................. 2009-137537
Jun. 8, 2009 (JP) ................................. 2009-137539
Mar. 2, 2010 (JP) ................................. 2010-045417

(51) Int. Cl.
*G11B 17/028* (2006.01)

(52) U.S. Cl. ........................................................ 720/707

(58) Field of Classification Search .................. 720/703, 720/704, 706, 707
See application file for complete search history.

(56) References Cited

U.S. PATENT DOCUMENTS

| 5,761,186 | A * | 6/1998 | Mushika et al. | 720/704 |
| 5,774,445 | A * | 6/1998 | Sawi et al. | 720/707 |
| 6,826,771 | B1 * | 11/2004 | Wada | 720/707 |
| 6,907,611 | B2 * | 6/2005 | Konno et al. | 720/604 |
| 7,263,704 | B2 * | 8/2007 | Fukasawa | 720/706 |
| 7,802,272 | B2 * | 9/2010 | Kanzawa et al. | 720/707 |
| 7,849,474 | B2 * | 12/2010 | Kuramoto et al. | 720/707 |
| 7,937,722 | B2 * | 5/2011 | Takaki et al. | 720/707 |
| 2008/0120633 | A1 * | 5/2008 | Takaki et al. | 720/707 |
| 2010/0313212 | A1 | 12/2010 | Nakanishi et al. | |
| 2011/0035763 | A1 | 2/2011 | Nakanishi et al. | |

FOREIGN PATENT DOCUMENTS

| JP | 3-048761 Y2 | 10/1991 |
| JP | 2000-113544 A | 4/2000 |
| JP | 2001-037141 A | 2/2001 |
| JP | 2004-146056 A | 5/2004 |
| JP | 2008-130208 A | 6/2008 |
| JP | 2008-135129 A | 6/2008 |

OTHER PUBLICATIONS

Nakanishi et al.; "Turntable"; U.S. Appl. No. 12/842,275, filed Jul. 23, 2010.
Copending U.S. Appl. No. 12/796,048 by Kosuke Nakanishi et al., filed Jun. 8, 2010.
Copending U.S. Appl. No. 12/842,275 by Kosuke Nakanishi et al., filed Jul. 23, 2010.

* cited by examiner

*Primary Examiner* — Brian Miller
(74) *Attorney, Agent, or Firm* — Westerman, Hattori, Daniels & Adrian, LLP

(57) ABSTRACT

A turntable for a storage disk drive apparatus includes a plate member made of a ferromagnetic material and a central resin member arranged at the center of the plate member and provided with an outer peripheral portion positioned above the plate member. The central resin member includes claws extending downwards from the outer peripheral portion and claw position holes overlapping with the claws in the direction parallel to the center axis of the central resin member. The claw position holes include inner surfaces spaced apart from an edge of the plate member. The inner surfaces are defined by the resin. The central resin member includes a resin layer extending in the direction perpendicular to the center axis. The resin layer exists between the portion of the edge of the plate member around the claw position holes and the claw position holes.

15 Claims, 21 Drawing Sheets

A — A

TURNTABLE FOR A STORAGE DISK DRIVE APPARATUS, A MOTOR USING THE TURNTABLE, A STORAGE DISK DRIVE APPARATUS USING THE SAME

BACKGROUND OF THE INVENTION

1. Field of the Invention

The present invention relates to a storage disk turntable, a motor and a storage disk drive apparatus.

2. Description of the Related Art

In a conventional storage disk drive apparatus, a motor is provided with a turntable for holding a storage disk. The turntable includes a turntable body and a center spindle. The turntable body is made of a magnetic material. The center spindle is made of a resin and integrally formed with the turntable body into a single member. A tapering peripheral surface whose diameter gets gradually reduced upwards is defined in the center spindle. On the tapering peripheral surface, disk rest pieces are provided at an equal interval along a circumferential direction. When a disk with a central hole is mounted on the turntable, the disk rest pieces come into contact with the edge portion of the central hole of the disk and undergo elastic deformation, thereby centering the disk with respect to the turntable body.

In the conventional turntable, the disk rest pieces are positioned in the openings of the turntable body. With this turntable body, it is likely that the edges of the openings of the turntable body comes into contact with a mold during the process of injection-molding of the disk rest pieces. If the metal part comes into contact with the portion of the mold that forms the disk-fixing claws such as the disk rest pieces or the like, it becomes impossible to accurately form the claws. This may possibly reduce the accuracy with which the disk is held in position by the turntable.

SUMMARY OF THE INVENTION

In order to overcome the problems described above, the present invention reliably prevents physical interference between a claw-forming portion of a mold and a plate member.

In accordance with a first embodiment of the invention, there is provided a turntable for a storage disk drive apparatus, including: a plate member made of a ferromagnetic material; and a central resin member arranged at the center of the plate member and provided with an outer peripheral portion positioned above the plate member, the central resin member being formed into a single member by injection-molding a resin. The central resin member includes a plurality of claws extending downwards from the outer peripheral portion and a plurality of claw position holes overlapping with the claws in the direction parallel or substantially parallel to the center axis of the central resin member. The claw position holes include inner surfaces that are spaced apart from an edge of the plate member over the entire periphery of the plate member. The inner surfaces are defined by the resin. The central resin member includes a resin layer extending in the direction perpendicular or substantially perpendicular to the center axis. A resin portion is provided such that an outer end of each of the claw position holes are provided by the resin portion extending in the direction perpendicular or substantially perpendicular to the center axis. The resin portion exists between the portion of the edge of the plate member around each of the claw position holes and each of the claw position holes. T In accordance with a second embodiment of the invention, there is provided a method for manufacturing a turntable for a storage disk drive apparatus. The method of the invention includes the steps of: attaching a plate member made of a ferromagnetic material to one of two molds and creating a cavity by clamping the molds together with the plate member arranged between the molds; and forming a single central resin member at the center of the plate member by injecting a resin into the cavity. A plurality of claws extending downwards from the portion of the central resin member positioned above the plate member is formed in the step of forming the central resin member by filling a resin in the spaces defined between a plurality of claw-forming parts protruding from one of the molds toward the other. The entire periphery of each of the claw-forming parts are spaced apart from an edge of the plate member. A resin layer extending in the direction perpendicular or substantially perpendicular to the center axis of the plate member are formed in the portion of the edge of the plate member around the claw-forming parts by filling the resin in the spaces defined between the portion of the edge of the plate member around the claw-forming parts and the peripheries of the claw-forming parts.

According to the present invention, the turntable reliably prevents physical interference between a claw-forming portion of a mold and a plate member.

Other features, elements, steps, characteristics and advantages of the present invention will become more apparent from the following detailed description of embodiments of the present invention with reference to the attached drawings.

DETAILED DESCRIPTION OF THE INVENTION

In the specification, the upper side in the direction of a center axis J1 is referred to as "upper" and the lower side as "lower". The terms "upper" and "lower" used in the specification are not intended to designate the positional relationship or direction when actually mounted to devices.

(First Embodiment)

Figure 1:
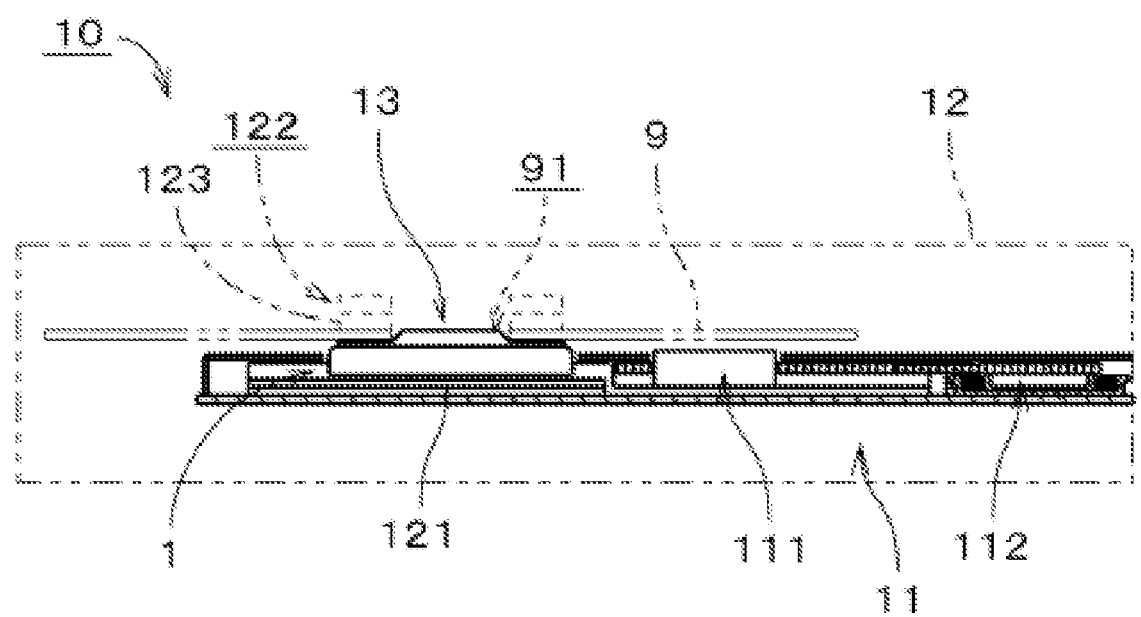
FIG. 1 is a sectional view showing a storage disk drive apparatus according to a first embodiment.

FIG. 1 is a sectional view showing a storage disk drive apparatus 10 provided with a motor according to the first embodiment of the present invention. The drawing illustrates it along a plane containing the center axis of the storage disk drive apparatus 10. As shown, the storage disk drive apparatus 10 includes a motor 1, an access unit and a box-like housing 12 arranged to accommodate the motor 1 and the access unit 11 therein. In FIG. 1, the housing 12, a clamper 122, a clamp magnet 123 and a storage disk 9 are indicated by double-dot chain lines. The motor 1 is held in place by a chassis 121. The access unit 11 includes a head 111 and a head moving mechanism 112. The head 111 can be an optical pickup mechanism designed to perform a task of reading information from the storage disk 9 and/or a task of writing information on the storage disk 9. Examples of the storage disk 9 include a Blu-ray disc. The head moving mechanism 112 can move the head 111 with respect to the motor 1 and the storage disk 9. The head 111 can include a light-emitting portion and a light-receiving portion. The light-emitting portion can emit laser light toward the lower surface of the storage disk 9. The light-receiving portion can receive the light reflected from the storage disk 9.

A transfer mechanism (not shown) can be provided in the housing 12. The storage disk 9 can be inserted into or taken out of the housing 12 by the transfer mechanism. Furthermore, the clamper 122 having the clamp magnet 123 can be provided in the housing 12.

If the storage disk 9 is inserted into the housing 12, the central hole 91 of the storage disk 9 is positioned above the turntable 13 of the motor 1. Then, the motor 1 is moved upwards to mount the storage disk 9 on the turntable 13. The clamp magnet 123 attracts the metallic plate member of the turntable 13 from above. The storage disk 9 can be clamped on the turntable 13 by the clamper 122.

In the storage disk drive apparatus 10, the storage disk 9 can be rotated by the motor 1 and the head 111 can be moved to a certain position by the head moving mechanism 112 such that the head 111 can perform a task of reading information from the storage disk 9 and/or a task of writing information on the storage disk 9. When the storage disk 9 is taken out of the housing 12, the clamper 122 can be moved away from the storage disk 9 and the motor 1 can be moved downwards, thereby allowing the storage disk 9 to be removed from the turntable 13.

Figure 2:
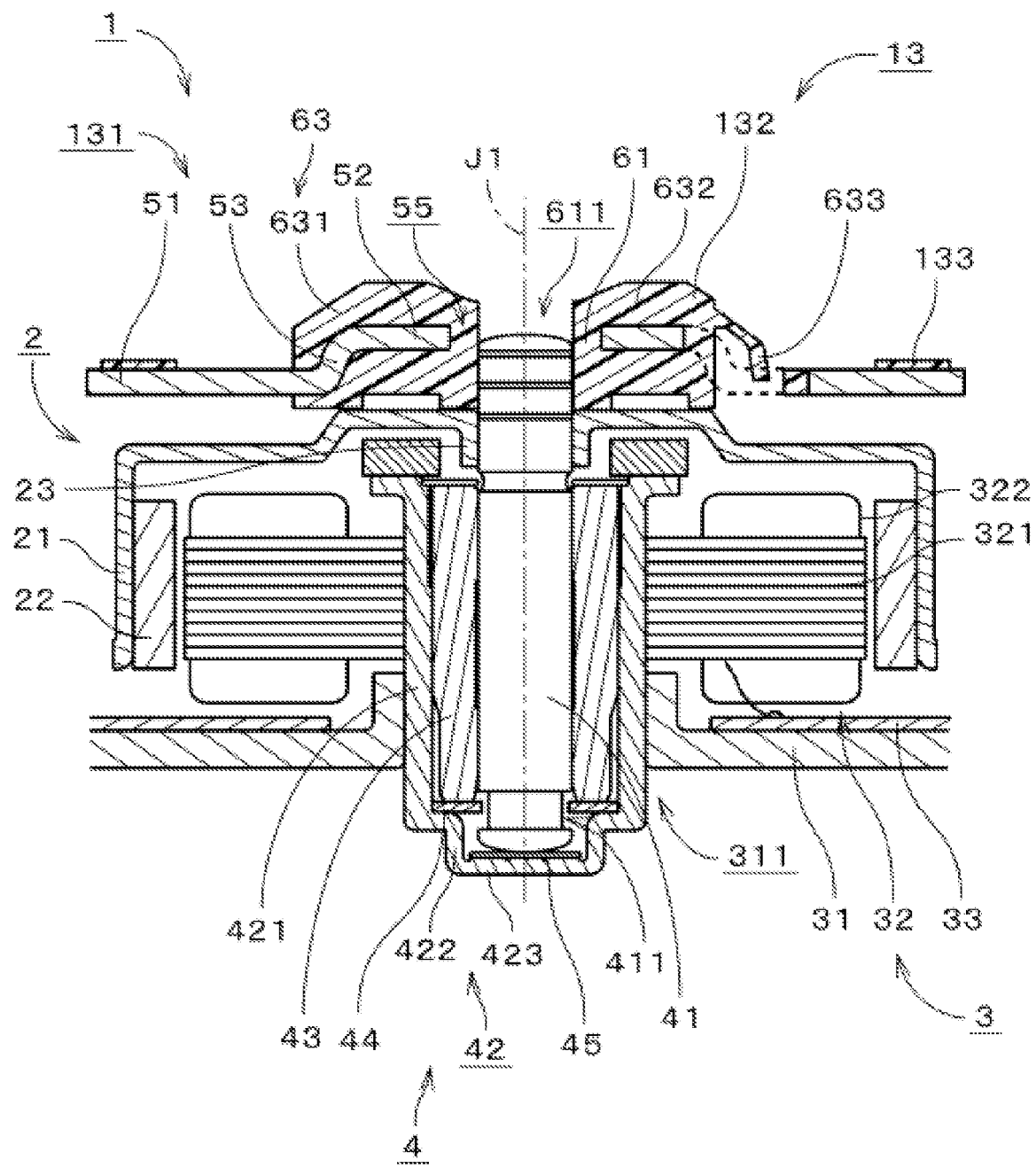
FIG. 2 is a sectional view showing a motor of the first embodiment.

FIG. 2 is a vertical sectional view of the motor 1. As shown, the motor 1 includes a rotary unit 2 as a rotating assembly, a stationary unit 3 as a fixed assembly, the turntable 13 and a bearing mechanism 4. The rotary unit can be supported above the stationary unit 3 by the bearing mechanism 4 such that the rotary unit 2 can rotate with respect to the stationary unit 3. The turntable 13 is provided at the upper end of the rotary unit 2.

The rotary unit 2 can include a substantially cylindrical cup member 21 with the top and an annular rotor magnet 22. The rotor magnet 22 can be attached to the inner surface of the cylinder portion of the cup member 21. A substantially cylindrical shaft-fixing portion 23 is provided at the center of the cup member 21. The bearing mechanism 4 includes a shaft 41 inserted into the shaft-fixing portion 23 and fixed to the cup member 21.

The stationary unit 3 can include a substantially flat base portion 31, a stator 32 and a circuit board 33. The circuit board 33 can be arranged on the base portion 31. The base portion 31 can be made of metal and is provided with a central hole 311 to which the bearing mechanism 4 is attached. The stator 32 can include a stator core 321 and a plurality of coils 322 can be wound around the stator core 321. The stator core 321 can be formed of laminated steel plates. The stator 32 can be attached to the outer surface of a cylinder portion 421 of a sleeve retainer 42 and arranged opposite to the rotor magnet 22 in the direction perpendicular or substantially perpendicular to the center axis J1. When the motor 1 is driven, a magnetic interaction occurs between the rotor magnet 22 and the stator 32.

The bearing mechanism 4 can include the shaft 41, a substantially cylindrical sleeve retainer 42 with the bottom, a sleeve 43 and a substantially annular removal-preventing member 44. An annular groove 411 can be provided at the lower end portion of the shaft 41. The sleeve 43 can be made of an oil-containing porous metallic body. The sleeve retainer 42 can include a cylinder portion 421, an annular step portion 422 and a bottom portion 423. The diameter of the step portion 422 can be reduced from the lower end of the cylinder portion 421 toward the center axis J1. The bottom portion 423 can be provided at the lower side of the step portion 422 to close the lower end of the sleeve retainer 42.

The removal-preventing member 44 can be made of an elastic material such as a resin which can be placed on the step portion 422. The inner end portion of the removal-preventing member 44 can be positioned in the groove 411 of the shaft 41, thereby preventing the shaft 41 from being removed out of the sleeve retainer 42. A disc-shaped thrust plate 45 can be provided at the bottom portion 423. During the operation of the motor 1, the tip end of the shaft 41 bears against the thrust plate 45 such that the shaft 41 can be stably supported in the axial direction. In addition, the shaft 41 can be radially supported by the sleeve 43 with oil interposed therebetween.

The turntable 13 can include a disc-shaped plate member 131, an annular central resin member 132 and an annular rubber member 133. The center axis J1 of the motor 1 serves as the center axis of the plate member 131 and the center axis of the central resin member 132. In FIG. 2, the inner portion of the plate member 131 is partially indicated by a broken line. The plate member 131 can be made of a soft ferromagnetic material and formed into a desired shape by a press work. The thickness of the plate member 131 can be equal to about 0.8 mm. The plate member 131 can be formed from, e.g., an electrogalvanized steel plate (SECC).

The plate member 131 can include a peripheral plate portion 51, a central plate portion 52 and a bent portion 53 between the peripheral plate portion 51 and the central plate portion 52. The peripheral plate portion 51 can be substantially perpendicular to the center axis J1. The central plate portion 52 can be substantially perpendicular to the center axis J1 and positioned higher than the peripheral plate portion 51. In the turntable 13, a great enough magnetic interaction can be caused between the clamp magnet 123 shown in FIG. 1 and the peripheral plate portion 51 of the plate member 131. Therefore, the plate member 131 can be made of a soft ferromagnetic material that could be selected from low-priced materials. This makes it possible to manufacture the turntable 13 in a cost-effective manner.

The central resin member 132 can be arranged substantially at the center of the plate member 131 and formed by injection-molding a resin. Thus, the plate member 131 and the central resin member 132 can be formed into a single integrated part. An injection molding can be performed with greater shaping accuracy than a press work. More specifically, the mold components used in forming the central resin member 132 can be formed with a tolerance of about 5 μm to 10 μm, while the plate member 131 can be formed with a tolerance of about 50 μm. The central resin member 132 can protrude upwards beyond the peripheral plate portion 51. Since the central resin member 132 covers substantially all the central plate portion 52 and the bent portion 53, the plate member 131 can be prevented from being removed from the central resin member 132. The central resin member 132 can be made of a resin material, e.g., polycarbonate or any other desirable material.

The central resin member 132 can include a resinous cylinder portion 61, a disk guide portion 631, a resinous connector portion 632 and a plurality of claws 633. The central resin member 132 including these portions can be formed into a single piece member. The resinous cylinder portion 61 can be positioned inside the plate center hole 55 defined substantially at the center of the plate member 131. The resinous cylinder portion 61 is provided with a central through-hole 611 extending through the plate center hole 55. The upper portion of the shaft 41 can be fixed into the central through-hole 611.

The disk guide portion 631 can be positioned in the upper outer periphery of the central resin member 132 and inclined radially outwards and downwards with respect to the center axis J1. The bent portion 53 of the plate member 131 can be bent to generally conform to the outer periphery shape of the disk guide portion 631. The resinous connector portion 632 can cover all the central plate portion 52 and interconnect the resinous cylinder portion 61 and the disk guide portion 631. In the central resin member 132, the disk guide portion 631 and the resinous connector portion 632 can define an upper portion 63 that is positioned higher than the plate member 131.

The claws 633 can be provided at plural points of the disk guide portion 631, namely the outer periphery of the upper portion 63. The claws 633 can extend radially outwards and downwards from the disk guide portion 631 toward the center axis J1. An undercut is defined between the disk guide portion 631 and each of the claws 633. In the following description, the radial direction with respect to the center axis J1 is referred to as "radial" or "radially" and the circumferential direction is referred to as "circumferential" or "circumferentially".

When the storage disk 9 as shown in FIG. 1 is mounted on the turntable 13, the disk center hole 91 is guided toward the claws 633 by the disk guide portion 631. Thus, the claws 633 come into contact with the disk center hole 91. Consequently, the storage disk 9 is arranged on the plate member 131. More precisely, the storage disk 9 can be mounted on the annular rubber member 133 on the plate member 131. In this state, the claws 633 can be elastically deformed radially inwards while they are supported by the resinous connector portion 632. Use of the elastic deformation of the claws 633 can accurately place the center of the storage disk 9 on the center axis J1. As a result, a storage disk such as a Blu-ray disk, which requires high centering performance, can be attached to the turntable 13 with increased accuracy.

Figure 3:
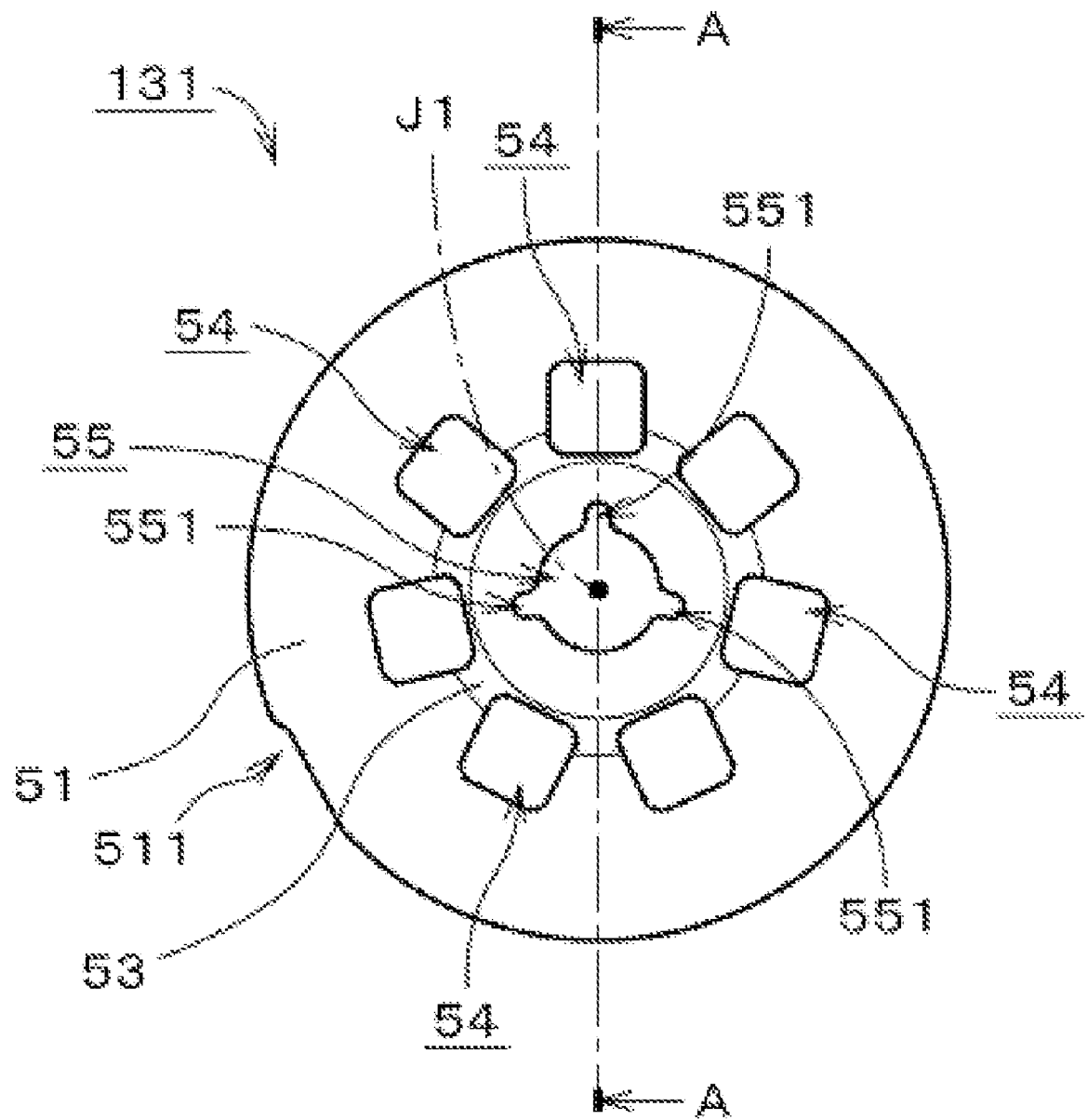
FIG. 3 is a planar view showing a plate member of the first embodiment.
Figure 4:
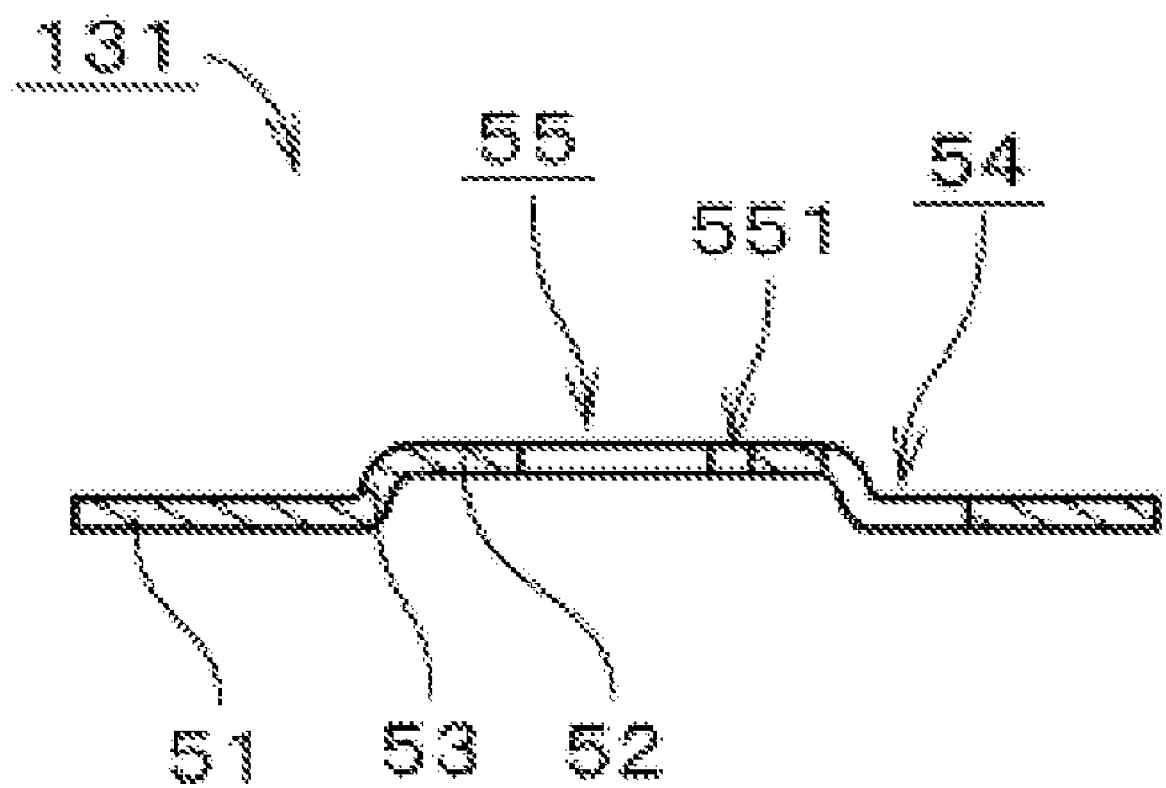
FIG. 4 is a sectional view of the plate member of the first embodiment.

FIG. 3 is a top view of the plate member 131. FIG. 4 is a sectional view of the plate member 131 taken along line A-A in FIG. 3. Seven openings 54 can be circumferentially provided in the plate member 131 by punching the peripheral plate portion 51 and the bent portion 53 at seven points. Three cutouts 551 extending radially outwards from the plate center hole 55 can be provided in the plate center hole 55. As shown in FIG. 3, the cutouts 551 can extend such that the angle between the adjacent ones with respect to the center of the plate center hole 55, i.e., the center axis J1, becomes greater than 90 degrees. An additional cutout 511 can be defined in the outer edge of the peripheral plate portion 51.

Figure 5:
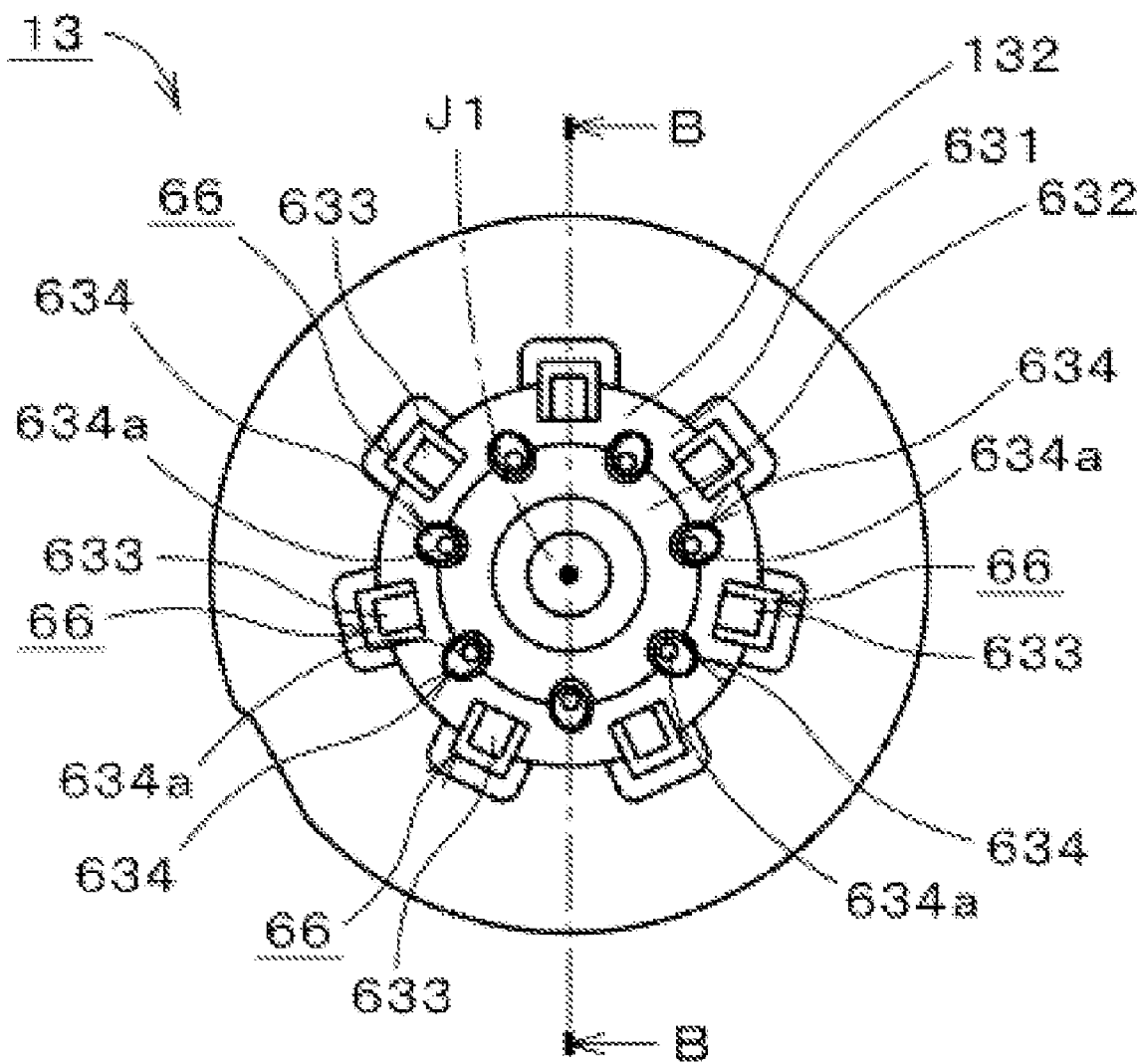
FIG. 5 is a top view showing a turntable of the first embodiment.
Figure 6:
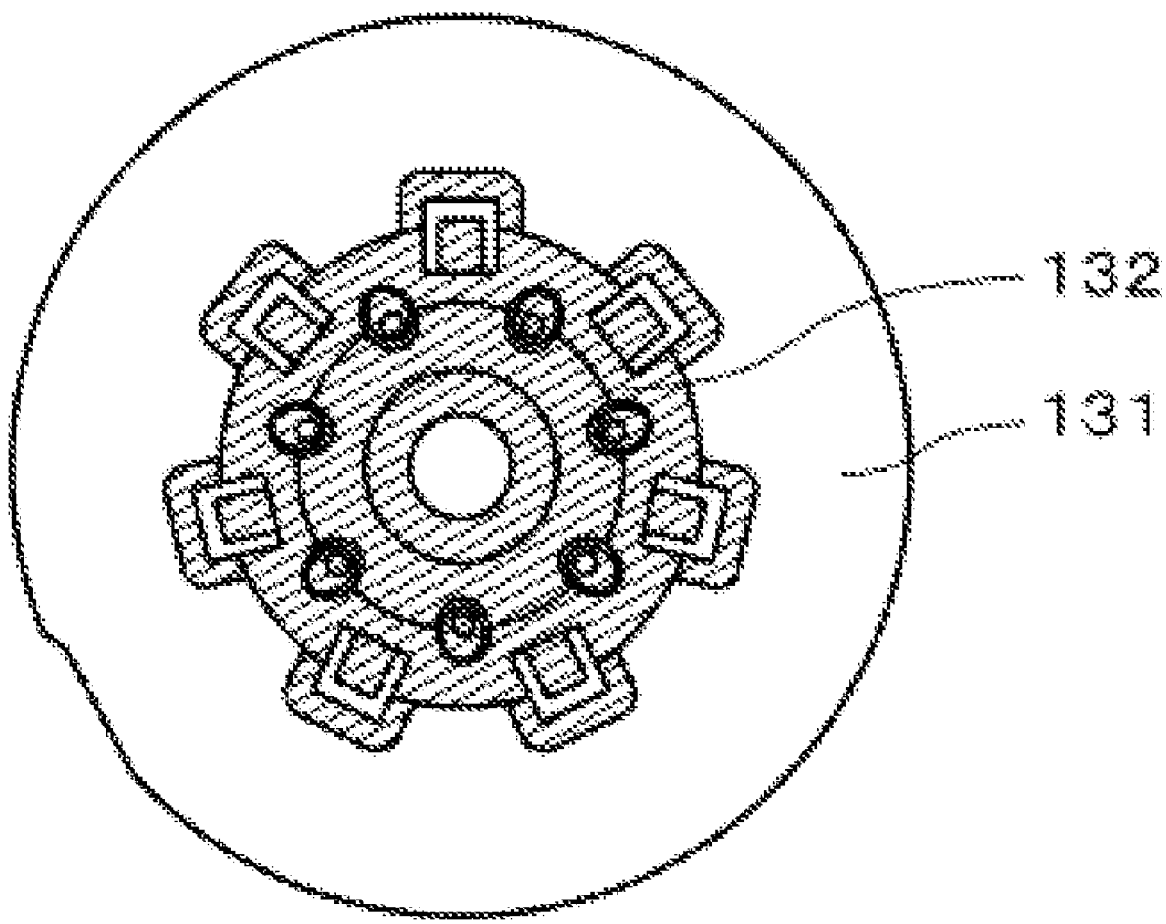
FIG. 6 is another top view of the turntable of the first embodiment.
Figure 7:
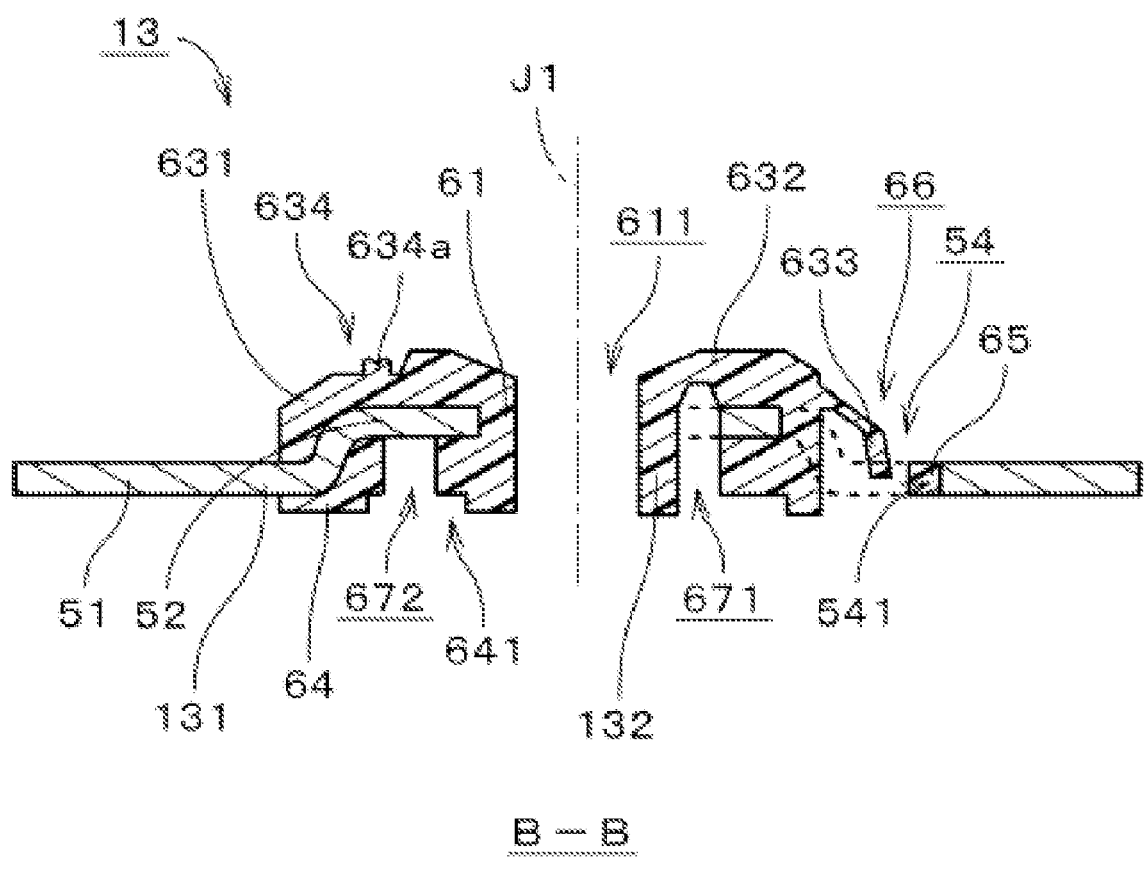
FIG. 7 is a sectional view of the turntable of the first embodiment.

FIGS. 5 and 6 are top views of the turntable 13. The central resin member 132 is hatched in FIG. 6. FIG. 7 is a sectional view of the turntable 13 along line B-B in FIG. 5. In FIG. 7, the inner portion of the plate member 131 is partially indicated by a broken line. As shown in FIGS. 5 and 7, seven downwardly-indented recess portions 634 can be formed at an equal circumferential interval in the resinous connector portion 632 and the disk guide portion 631 such that they can extend over the resinous connector portion 632 and the disk guide portion 631. As will be discussed below, when injection-molding the central resin member 132, a resin is injected into the cavity of a mold through the gates formed in a corresponding relationship with the recess portions 634. The resin can be severed at the gates when a molded product is removed from the mold. This leaves gate cut portions 634a, raised gate vestiges, in the recess portions 634.

Figure 8:
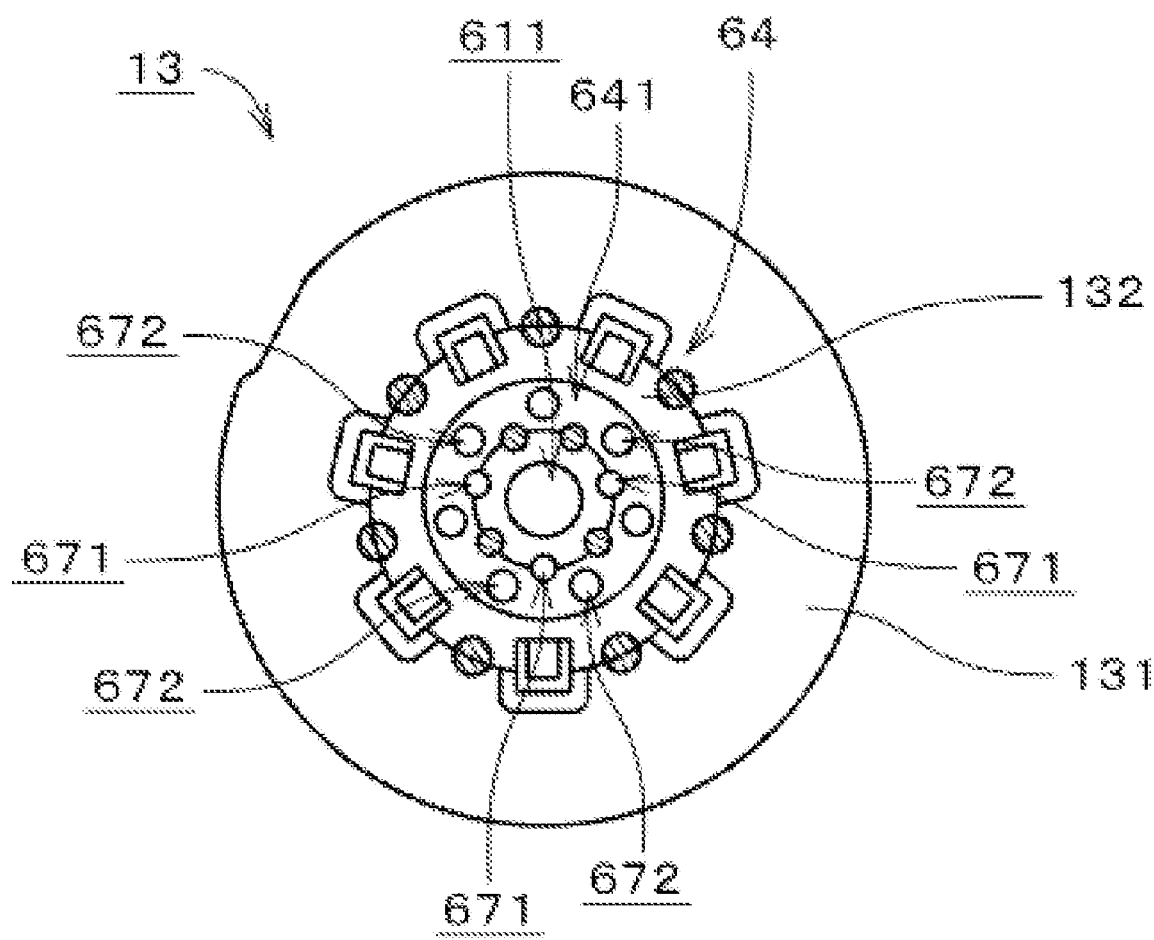
FIG. 8 is a bottom view of the turntable of the first embodiment.
Figure 9:
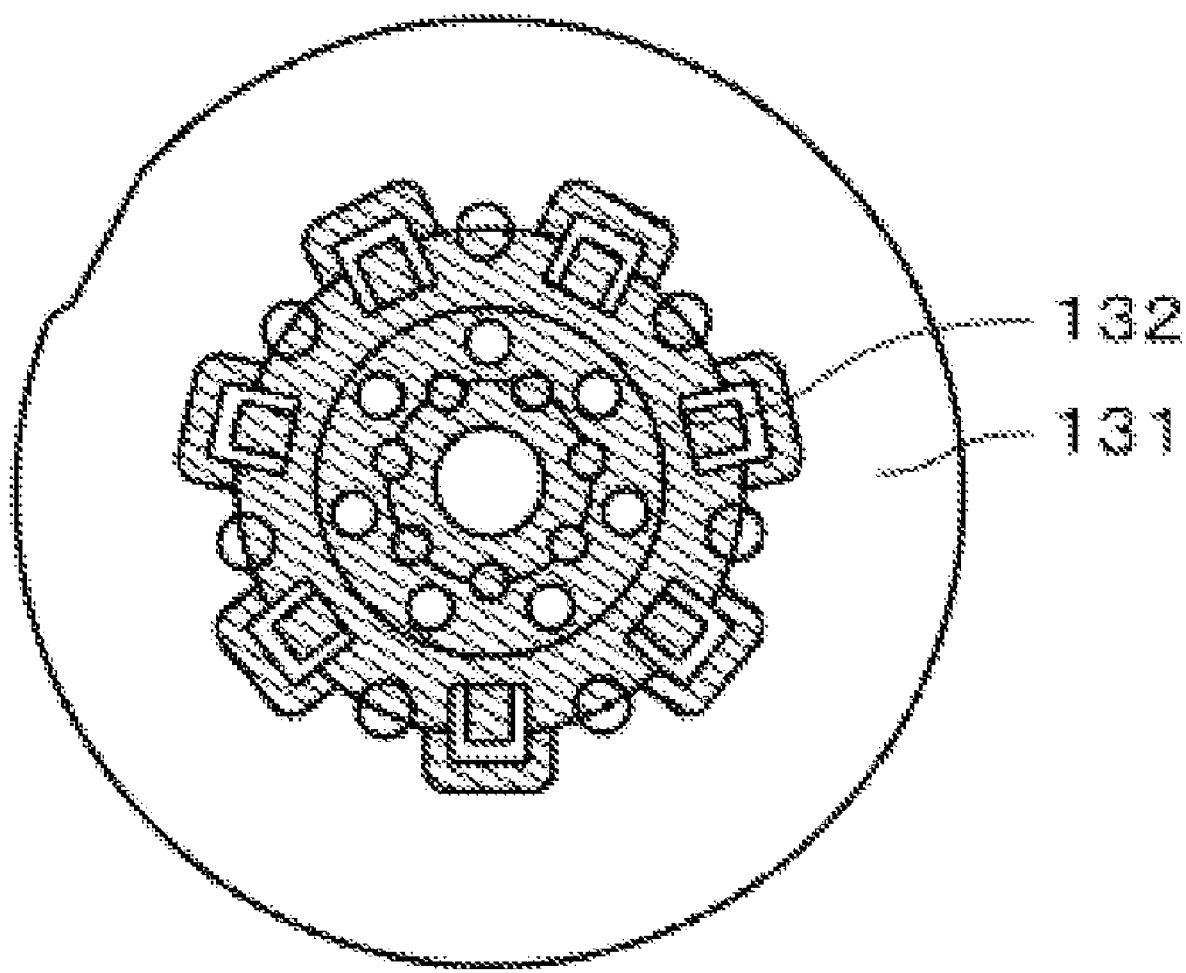
FIG. 9 is another bottom view of the turntable of the first embodiment.

FIGS. 8 and 9 are bottom views of the turntable 13. The central resin member 132 is hatched in FIG. 9. As shown in FIGS. 7 and 8, an annular resin recess portion 641 indented upwards around the central through-hole 611 can be formed in the lower portion 64 of the central resin member 132 positioned lower than the plate member 131. Different kinds of pins can be arranged within the cavity when injection-molding the central resin member 132. Thus, a plurality of blind holes 671 and 672 as vestiges of the pins can be left in the resin recess portion 641.

Figure 10:
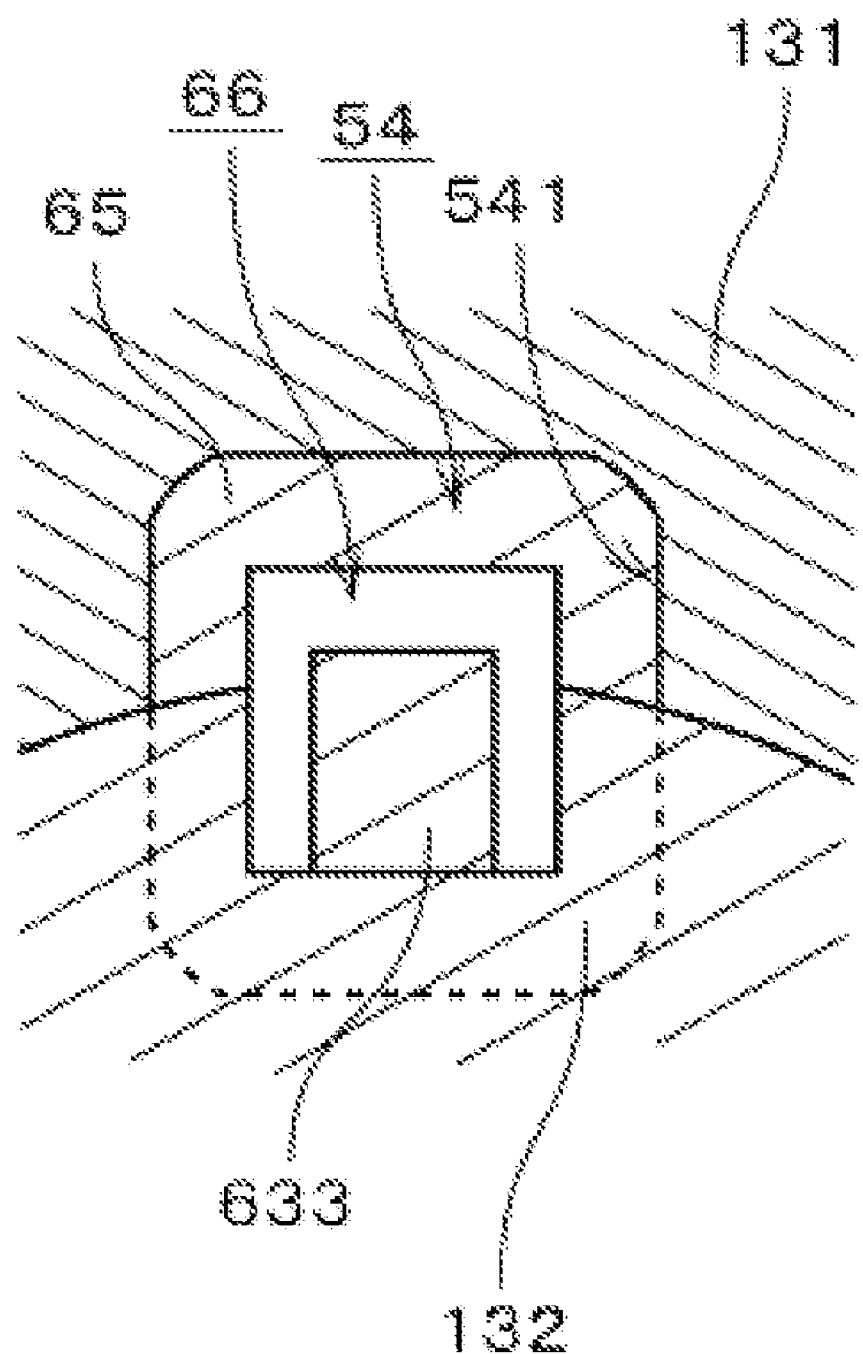
FIG. 10 is a view showing a claw on an enlarged scale of the first embodiment.

FIG. 10 illustrates an enlarged view of one of the claws 633 shown in FIG. 5 and its vicinities. The central resin member 132 is widely hatched and the plate member 131 is narrowly hatched in FIG. 10. The portion of the edge 541 of each of the openings 54 of the plate member 131, which is covered with the central resin member 132, is indicated by a broken line. As illustrated in FIGS. 7 and 10, the central resin member 132 can be provided with a resin layer or resin portion 65 formed in the edge 541 of each of the openings 54. As illustrated in FIGS. 9 and 10, the resin layer or resin portion 65 is provided in a ring shape such that it surrounds each of the claws 633. The resin layer or resin portion 65 is continuously and outward extended from the central resin member 132. As illustrated in FIG. 7, the outer part of the resin layer or resin portion 65 is located outside of the tip of the claw 633. The tip of each of the claws 633 is located inside the opening of the resin layer or resin portion 65.

The thickness of the resin layer 65 in the direction perpendicular or substantially perpendicular to the center axis J1, namely the shortest distance between the edge 541 of each of the openings 54 and the inner periphery of the resin layer 65, can be set equal to or greater than 0.5 mm in an effort to prevent occurrence of resin shortage in an injection-molding process. More preferably, the thickness can be set equal to or greater than 0.7 mm so that the resin shortage can be reliably prevented even when the resin viscosity is high. In order to prevent the resin layer 65 from becoming too thick, the thickness can be set equal to or smaller than 1 mm. Various kinds of dimensions can be set in light of the fluidity of the resin and the tolerable dimension of the resin layer.

A claw-positioning hole 66 overlapping with each of the claws 633 in the direction parallel or substantially parallel to the center axis J1 can be formed at the inner side of the resin layer 65. In other words, the inner surface of the claw-positioning hole 66 can be horizontally spaced apart from the edge 541 of the corresponding opening 54 over the entire circumference thereof. The inner surface of the claw-positioning hole 66 can be defined by a resin in its entirety. This ensures that, in the direction perpendicular to the center axis J1, the resin layer 65 exists between the edge 541 of each of the openings 54 and the corresponding claw-positioning hole 66 over the entire periphery thereof. The edge 541 of each of the openings 54 refers to the portion of the edge of the plate member 131 around the corresponding claw-positioning hole 66.

As shown in FIG. 7, the tip end of each of the claws 633 can be positioned within the corresponding claw-positioning hole 66. Referring back to FIG. 5, the claws 633 can be identical in number with the claw-positioning holes 66. The claws 633 and the claw-positioning holes 66 can be in a one-to-one correspondence relationship. The plate member 131 of such a configuration can be greater in strength than a conventional plate member having a single large circular opening formed in an overlapping relationship with a plurality of claw-positioning holes.

Next, a process for manufacturing the turntable 13 will be described with reference to FIG. 11. A plurality of plate members 131 can be first produced by a press work (step S11). The plate members 131 can be stored in a specified storage unit. Within the storage unit, the cutouts 511 (see FIG. 3) of the outer peripheral edge of the plate members 131 are kept in contact with a rod-shaped member so that the circumferential positions, i.e., the circumferential orientations, of the plate members 131 can become uniform. In this way, the cutouts 511 can be used to provisionally determine the circumferential positions of the plate members 131 before each of the plate members 131 is attached to a mold. This makes it easy to attach each of the plate members 131 to the mold.

Figure 12:
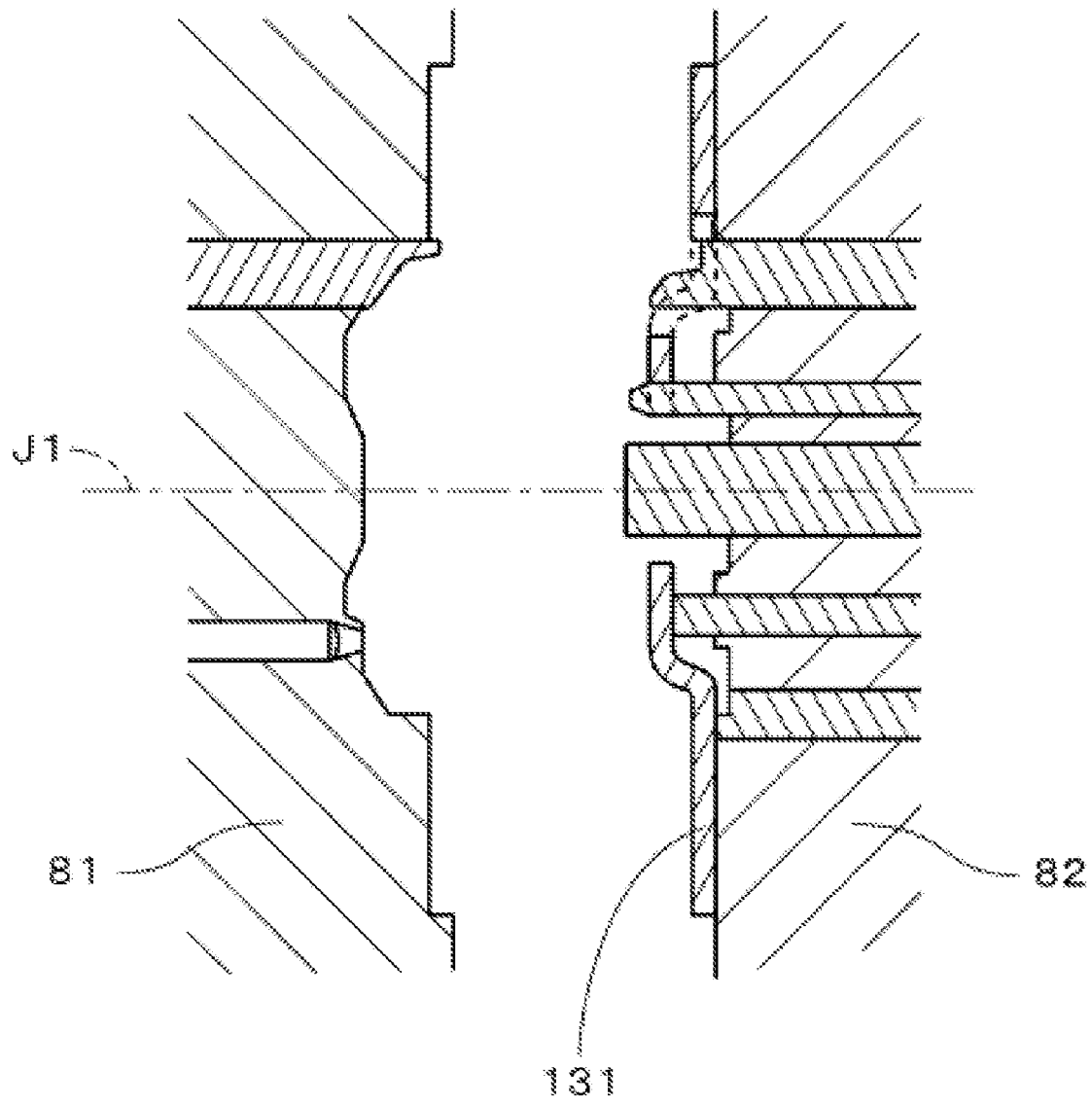
FIG. 12 is a view showing a mold and a plate member of the first embodiment.
Figure 13:
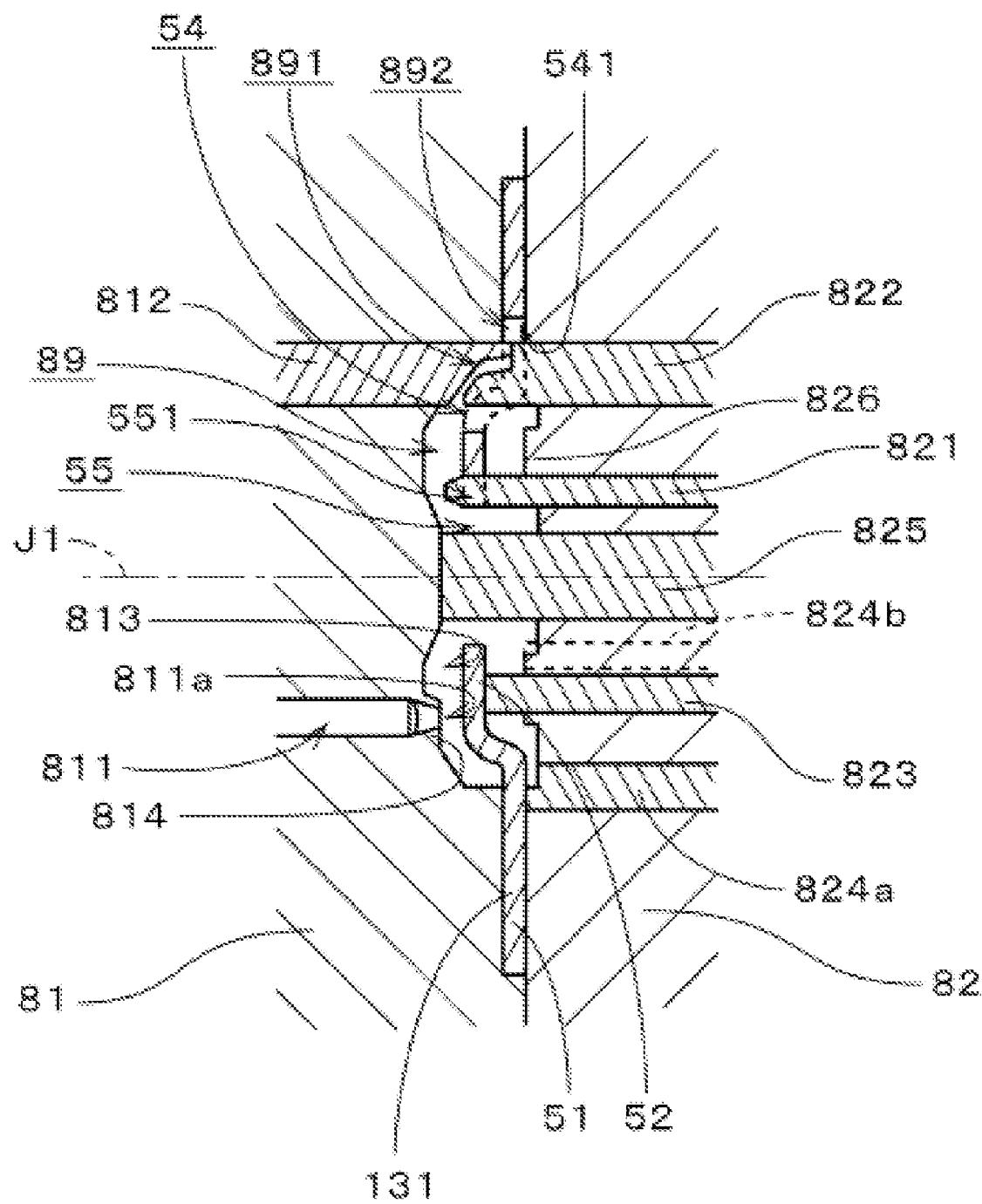
FIG. 13 is another view showing the mold and the plate member of the first embodiment.

Then, one of the plate members 131 can be picked up by a transfer mechanism and is taken out of the storage unit. As shown in FIG. 12, the plate member 131 is attached to a movable mold 82 by a magnetic action or an air suction force in a state that the center axis J1 of the plate member 131 is oriented horizontally (step S12). The movable mold 82 and the plate member 131 are moved toward a fixed mold 81 along the center axis J1. As illustrated in FIG. 13, the fixed mold 81 and the movable mold 82 are clamped together with the plate member 131 interposed therebetween. A cavity 89 is defined between the fixed mold 81 and the movable mold 82 (step S13).

The fixed mold 81 can include flow paths 811 through which to feed a resin into the cavity 89 and first claw-forming parts 812 by which to form each of the claws. The first claw-forming parts 812 can protrude toward the movable mold 82. An annular recess portion 813 coaxial with the center axis J1 can be formed in the fixed mold 81. Raised portions 814 slightly protruding toward the central plate portion 52 can be formed at seven circumferentially-spaced-apart points of the recess portion 813. The gates 811a of the flow paths 811 can be positioned in the respective raised portions 814.

The movable mold 82 can be provided with different kinds of pins. Positioning pins 821 as a portion of the movable mold 82 can protrude toward the plate center hole 55 and be inserted into the cutouts 551. As the positioning pins 821 come into contact with the cutouts 551 in the direction perpendicular or substantially perpendicular to the center axis J1, the plate member 131 can be fixed with respect to the movable mold 82 in the direction perpendicular or substantially perpendicular to the center axis J1. In the following description, the cutouts 551 is referred to as "positioning portions 551". It is not necessary that the circumferential width of the positioning portions 551 be precisely equal to the diameter of the positioning pins 821. A small gap can be left between the positioning portions 551 and the positioning pins 821 as long as it can secure a resin layer formation space 892 which will be described below.

Second claw-forming parts 822 by which to form the claws can be provided in the movable mold 82. The second claw-forming parts 822 can protrude toward the first claw-forming parts 812. The first claw-forming parts 812 and the second claw-forming parts 822 can be respectively inserted into the openings 54 of the plate member 131. Claw-forming spaces 891 for forming the claws 633 can be defined between first claw-forming parts 812 and the second claw-forming parts 822. In the direction perpendicular or substantially perpendicular to the center axis J1, resin layer formation spaces 892 for forming the resin layers 65 can be defined between the first and second claw-forming parts 812 and 822 and the edges 541 of the openings 54. In other words, the first and second claw-forming parts 812 and 822 can be spaced apart from the edges 541 of the openings 54. The circumferential width between the positioning pins 821 and the positioning portions 551 can be smaller than the circumferential width between the first and second claw-forming parts 812 and 822 and the edges 541 of the openings 54.

An annular mold-side raised portion 826 coaxial with the center axis J1 can be formed on the surface of the movable mold 82 to face the fixed mold 81. A plurality of support pins 823 can protrude from the mold-side raised portion 826. The support pins 823 come into contact with the lower surface of the central plate portion 52, namely the right surface of the central plate portion 52 shown in FIG. 13. The support pins 823 can be opposed to the gates 811a of the flow paths 811. The support pins 823 can support the central plate portion 52 against the resin stream flowing from the gates 811a.

Two kinds of release pins 824a and 824b for separating a molded product from the movable mold 82 can be provided in the movable mold 82. The release pin 824a is provided with a step portion at its tip end so that a portion of the tip end can make contact with the peripheral plate portion 51. The release pin 824b can be positioned radially inwards of the release pin 824a and opposed to the central plate portion 52. The release pin 824b can be also provided in other position than the position shown in FIG. 13. A central pin 825 can be inserted into the plate center hole 55 of the central plate portion 52. The central pin 825 can come into contact with the portion of the fixed mold 81 positioned radially inwards of the recess portion 813.

Once the fixed mold 81 and the movable mold 82 are clamped together, a resin under pressure is injected into the cavity 89 from the gates 811a (step S14). The resin can be spread from an upper portion to a lower portion of the plate member 131. The resin can be fully filled in the cavity 89 including the claw-forming spaces 891 and the resin layer formation spaces 892. Thus, the claws 633 as shown in FIG. 7 can be formed at the claw-forming spaces 891. The resin layers 65 as shown in FIG. 7 can be formed in the entire peripheries of the claw-forming units, i.e., the first and second claw-forming parts 812 and 822. That is to say, the resin can be filled in the resin layer formation spaces 892 between the peripheral edge portions of the plate member 131 around the claw-forming units and the entire peripheries of the claw-forming units. By doing so, the resin layers 65 can be formed in the entire peripheral edge portions of the plate member 131 around the claw-forming units along the direction perpendicular or substantially perpendicular to the center axis J1.

As explained above, the central plate portion 52 can be supported by the support pins 823 of the movable mold 82. This prevents deformation of the central plate portion 52, which would otherwise be caused by the pushing action of a resin stream. As a result, the invention can prevent axial dislocation of the peripheral plate portion 51.

Figure 14:
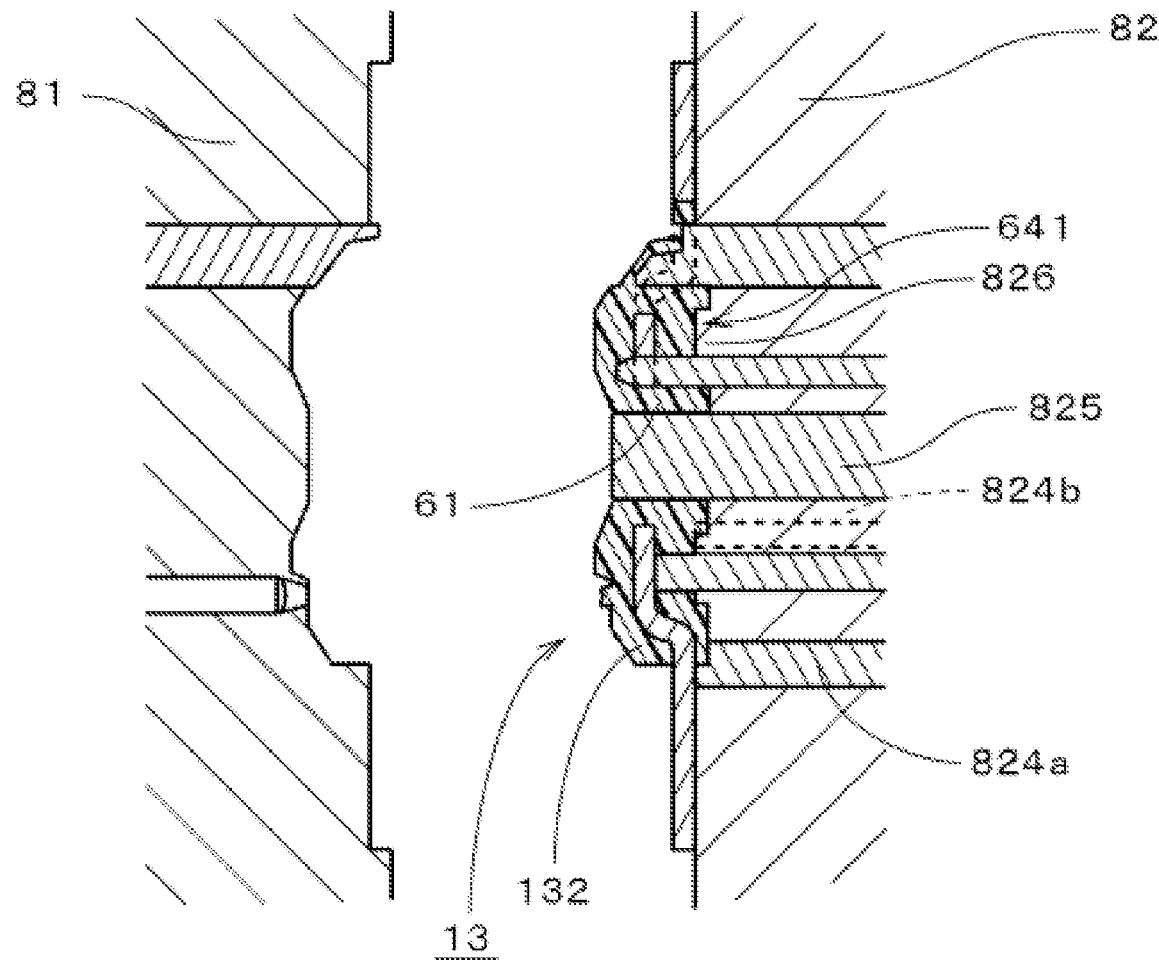
FIG. 14 is a further view showing the mold and the plate member of the first embodiment.

When the resin is cured and forms the central resin member 132, the movable mold 82 can be moved away from the fixed mold 81 as illustrated in FIG. 14. At this time, the resinous cylinder portion 61 and the central pin 825 make contact with each other, while the resin recess portion 641 and the mold-side raised portion 826 are brought into contact with each other. Thus, the turntable 13 is moved away from the fixed mold 81 together with the movable mold 82.

As hatched in FIG. 8, the release pins 824a and 824b lightly press the turntable 13 at eleven points. At the same time, the turntable 13 can be attracted and held by the transfer mechanism. Thus, the turntable 13 can be separated from the movable mold 82 (step S15).

As can be seen in FIG. 7, the resin layers 65 of the central resin member 132 cover the entire peripheries of the edges 541 of the openings 54 in the direction perpendicular or substantially perpendicular to the center axis J1, thereby forming the claw-positioning holes 66 that overlap with the openings 54.

Upwardly-indented recess portions 671 (hereinafter referred to as "positioning-pin recess portions 671" can be formed in the resin recess portion 641 in a corresponding relationship with the positioning pins 821. The inner circumferential surfaces of the positioning portions 551 can be exposed within the positioning-pin recess portions 671. Upwardly-indented recess portions 672 (hereinafter referred to as "support-pin recess portions 672") are formed in a corresponding relationship with the support pins 823. The lower surface of the plate member 131 can be partially exposed within the support-pin recess portions 672. As shown in FIG. 8, the positioning-pin recess portions 671 can be arranged between the support-pin recess portions 672 along the circumferential direction.

A slanting surface whose diameter is gradually increased radially outwards can be formed in the inner extension of the resinous connector portion 632 shown in FIG. 7. As the fixed mold 81 and the central pin 825 shown in FIG. 13 make contact with each other, a parting line can be formed between the slanting surface and the inner surface of the resinous cylinder portion 61. In the motor 1, the shaft 41 shown in FIG. 2 can be positioned lower than the parting line, thereby eliminating the possibility that that the shaft 41 and the parting line make contact with each other.

Subsequently, the turntable 13 can be brought into a specified container by the transfer mechanism. As shown in FIG. 7, the central plate portion 52 of the plate member 131 can protrude upwards beyond the peripheral plate portion 51. Thus, the thickness of the central resin member 132 can be kept small in the area above the plate member 131. As a result, generation of sinkage in the disk guide portion 631 as a critical dimension portion can be prevented even in the turntable 13 in which the upper surface of the central plate portion 52 is fully covered with the resin.

In the plate member 131, the bent portion 53 and the central plate portion 52 can be formed to conform to the outer surface shape of the disk guide portion 631 and the resinous connector portion 632. The resin portion existing on the bent portion 53 and the central plate portion 52 of the plate member 131 can be formed to have a substantially uniform thickness. This helps prevent occurrence of resin sinkage.

Since the plate member 131 is provided with the central plate portion 52, a contact area can be increased between the central resin member 132 and the plate member 131. The central plate portion 52 can be positioned higher than the peripheral plate portion 51. This structure can arrange the resin above and below the central plate portion 52, thereby increasing the contact area between the central resin member 132 and the plate member 131. Therefore, it is possible to prevent the plate member 131 and the central resin member 132 from being separated from each other.

Inasmuch as the gates 811a of the flow paths 811 shown in FIG. 13 can be positioned above the plate member 131, the disk guide portion 631 can be accurately formed in the upper portion of the central resin member 132 and the claws 633 can extend downwards from the upper portion of the disk guide portion 631. As can be seen in FIG. 5, the gate cut portions 634a can be situated between the claws 633 along the circumferential direction. In other words, each of the gates 811a can be positioned between the respective adjoining sets of the first claw-forming part 812 and the second claw-forming part 822 shown in FIG. 13. This can prevent a weld line from being positioned in the disk guide portion 631.

The resin can be rapidly filled in the claw-forming spaces 891 because the gates 811a are arranged above the plate member 131. Therefore, the claws 633 of the central resin member 132, which are thinner and required to have higher accuracy than the remaining portions, can be formed with increased accuracy and without generation of sinkage.

As shown in FIG. 7, the annular resin recess portion 641 can be formed in the lower portion 64 of the central resin member 132 by partially indenting the lower portion 64. This can reduce the resin thickness between the lower portion 64 and the plate member 131, thereby preventing resin sinkage in the lower portion 64. It is also possible to prevent resin sinkage in the resinous cylinder portion 61.

After one turntable 13 has been manufactured in this manner, a new plate member 131 is taken out of the storage unit. Then, steps S12 through S15 are performed to form the central resin member 132 in the plate member 131. In the manner stated above, a plurality of turntables 13 can be manufactured one after another. The annular rubber member 133 can be bonded to the plate member 131 in the subsequent step.

The resin layers 65 formed between the edges 541 of the openings 54 and the claw position hole 66 can be removed from the turntable 13 after step S15 in which the central resin member 132 is detached from the fixed mold 81 and the movable mold 82 (step S16). This assists in making the turntable 13 lightweight. The steps of removing the resin layers 65 can be collectively performed after a plurality of turntables 13 has been manufactured.

As explained above, the first and second claw-forming parts 812 and 822 can prevent contact with the openings 54 of the plate member 131 in the process of manufacturing the turntable 13. This can reliably prevent the first and second claw-forming parts 812 and 822 from physically interfering with the plate member 131. As a consequence, the invention can avoid damage caused in the first and second claw-forming parts 812 and 822. Since the first and second claw-forming parts 812 and 822 can be spaced apart from the openings 54 of the plate member 131, the resin layers 65 of the turntable 13 exist in the entire peripheries of the respective claw position holes 66.

In case where the first and second claw-forming parts 812 and 822 make contact with the edges 541 of the openings 54 of the plate member 131, unintentional fine gaps can be generated between the first and second claw-forming parts 812, 822 and the edges 541 of the openings 54 of the plate member 131 due to low manufacturing accuracy of the plate member 131. The resin may enter the gaps, thus producing burrs. In the present turntable 13, the first and second claw-forming parts 812 and 822 are sufficiently spaced apart from the edges 541 of the openings 54 of the plate member 131 so that the resin layers 65 can be formed by positively filling the resin between them. This eliminates the possibility of generating burrs.

By using the insert-molding, it is possible to manufacture the turntable 13 through a reduced number of steps and with increased accuracy. Since the plate member 131 does not require high shaping accuracy, it can be shaped by a cost-effective press work.

The central resin member 132 is designed such that the tip ends of the claws 633 can lie within the claw position holes 66. This helps reduce the force required in separating the first and second claw-forming parts 812 and 822 from the claws 633 during the injection-molding process.

upon injection-molding the resin, the position of the plate member 131 relative to the fixed mold 81 and the movable mold 82 can be determined in the central plate portion 52. This makes it possible to increase the area of the peripheral plate portion 51 axially opposed to the clamp magnet 123.

In case where positioning holes are provided in the peripheral plate portion 51, it is likely that the peripheral plate portion 51 may be deformed due to the presence of the positioning holes. In the present invention, the positioning task can be performed by the positioning portions 551. This makes it possible to secure the planarity of the peripheral plate portion 51 and to make substantially uniform the distance between the peripheral plate portion 51 and the clamp magnet 123 at the respective circumferential positions. Therefore, a stable magnetic attraction force can be created between the plate member 131 and the clamp magnet 123.

Since the positioning portions 551 of the plate member 131 are in the form of cutouts, the positioning pins 821 can be readily inserted into the positioning portions 551. This makes it easy to fix the plate member 131 to the fixed mold 81 and the movable mold 82. The number of the positioning portions 551 can be three, which makes it possible to stably determine the position of the plate member 131 in the direction perpendicular or substantially perpendicular to the center axis J1.

Figure 15:
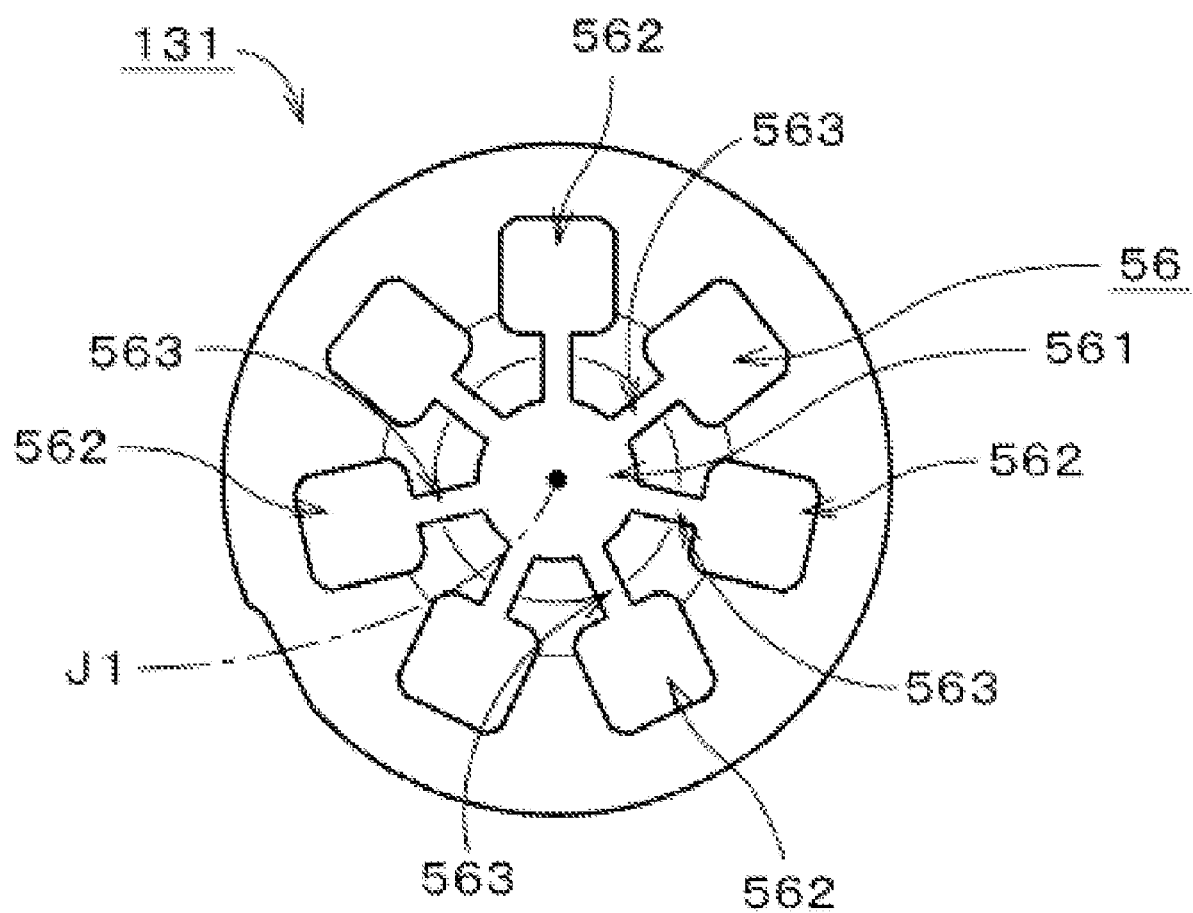
FIG. 15 is a top view showing a plate member of another example.

FIG. 15 is a view showing a plate member of another example. This plate member 131 can be provided with a single opening 56 formed by bringing the plate center hole 55 of the plate member 131 shown in FIG. 3 into communication with the openings 54 thereof. In the following description, the portion of the opening 56 corresponding to the plate center hole 55 is referred to as "central hole portion 561", and the portion of the opening 56 corresponding to the openings 54 as "peripheral openings 562". The cutouts that bring the central hole portion 561 and the peripheral openings 562 into communication with each other is designated by reference numeral "563". Other shapes of the plate member 131 shown in FIG. 15 can be the same as the corresponding shapes of the plate member 131 as shown in FIG. 3. In the following description, the same configurations are designated by like reference numerals.

A central resin member 132 having the same shape as shown in FIG. 5 can be formed on the plate member 131 by injection-molding. As in FIG. 7, the central resin member 132 can be provided with resin layers 65 covering the edges of the peripheral openings 562. Claw position holes 66 can be defined at the inner sides of the resin layers 65. In the plate member 131, the peripheral openings 562 illustrated in FIG. 15 can be formed in plural numbers to overlap with the claw position holes 66 shown in FIG. 7. The structure as illustrated in the drawing can increase the post-molding strength of the central resin member 132, as compared with a conventional plate member having a single large circular opening to be overlapped with the claw position holes 66.

Figure 11:
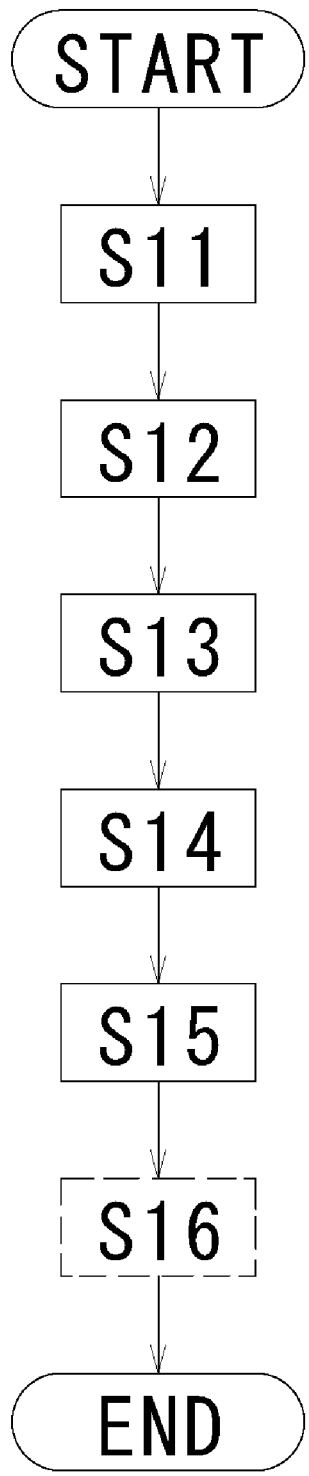
FIG. 11 is a flowchart illustrating a process for manufacturing the turntable of the first embodiment.

The step of injection-molding the central resin member 132 can be the same as the corresponding step illustrated in FIG. 11. In the injection-molding step, the claw-forming units, i.e., the first and second claw-forming parts 812 and 822 shown in FIG. 13, can be spaced apart from the edges of the peripheral openings 562 over the entire peripheries thereof. This helps reliably prevent the first and second claw-forming parts 812 and 822 from physically interfering with the plate member 131. In the portion of the edge of the plate member 131 around the first and second claw-forming parts 812 and 822 and the entire portion continuously extending from that portion, a resin can be filled in the direction perpendicular or substantially perpendicular to the center axis J1. As a result, the entire inner surfaces of the claw position holes 66 can be defined by the resin. In other words, the inner peripheral surfaces of the claw position holes 66 can be spaced apart from the edge of the plate member 131 over the entire peripheries. In the direction perpendicular or substantially perpendicular to the center axis J1, the resin layers 65 can be formed between the edges around the claw position holes 66, i.e., the edges 541 of the peripheral openings 562, and the claw position holes 66.

In case of providing the plate member 131 as shown in FIG. 15, the edge of the central hole portion 561 can be covered with the resin. In the portion of the edge of the plate member 131 around the first and second claw-forming parts 812 and 822 and the entire portion continuously extending from that portion, the resin can exist in the direction perpendicular or substantially perpendicular to the center axis J1. This helps minimize the contact between the molds and the plate member 131, which makes it possible to reduce wear of the molds and generation of foreign materials. The resin is not necessarily provided in the edge of the central hole portion 561 so long as it has little influence on the first and second claw-forming parts 812 and 822.

When the plate member 131 can be arranged within the molds, the positioning pins 821 can be inserted into the cutouts 563 shown in FIG. 15. The cutouts 563 can play a role of the positioning portions, thereby fixing the position of the plate member 131 relative to the molds in the direction perpendicular or substantially perpendicular to the center axis J1.

Figure 16:
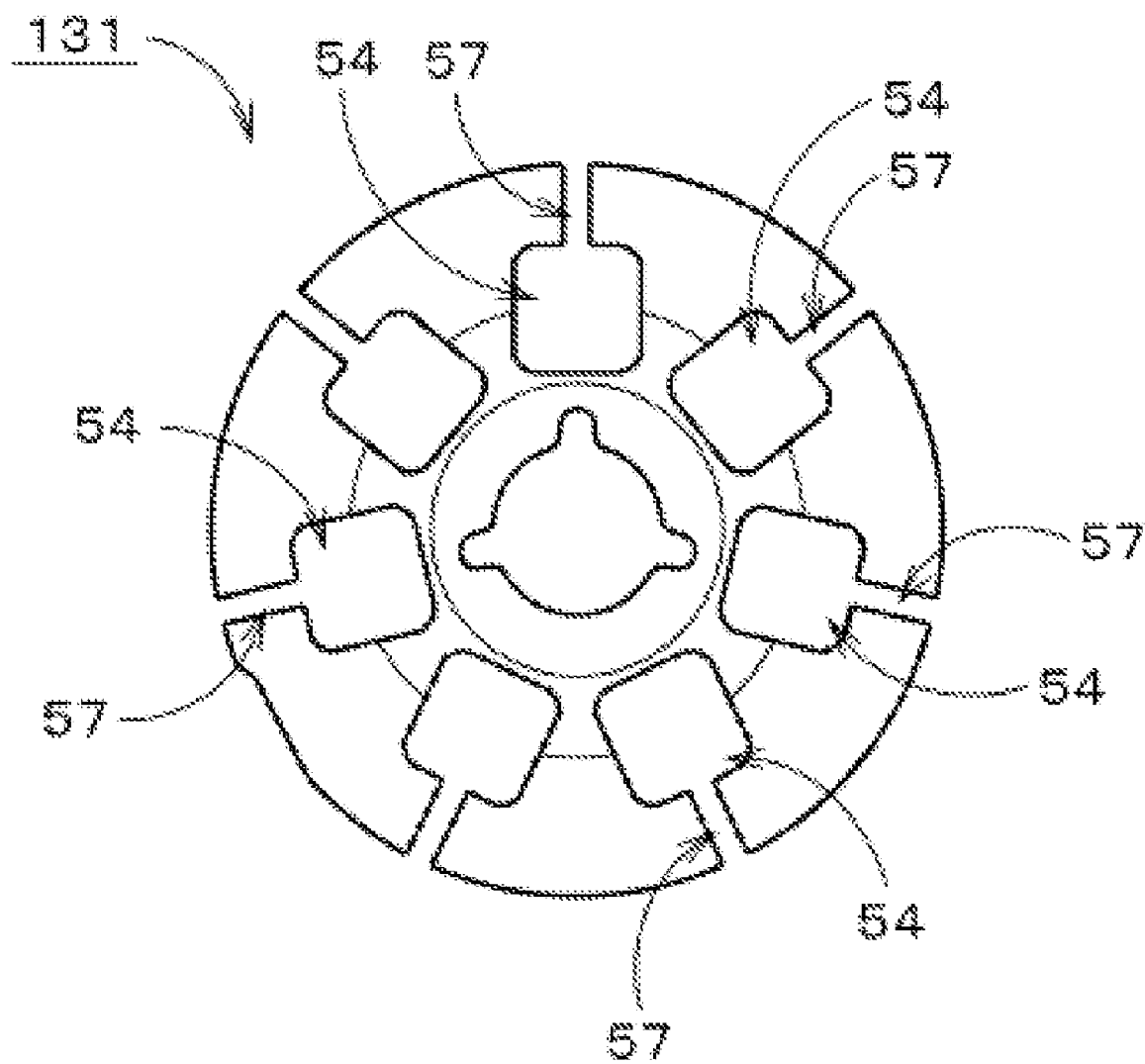
FIG. 16 is a top view showing a plate member of a further example.

FIG. 16 is a planar view showing a plate member of a further example. This plate member 131 can be provided with seven cutouts 57 extending radially outwards from the openings 54. Other shapes of the plate member 131 shown in FIG. 16 can be substantially the same as the corresponding shapes of the plate member 131 illustrated in FIG. 3.

Figure 17:
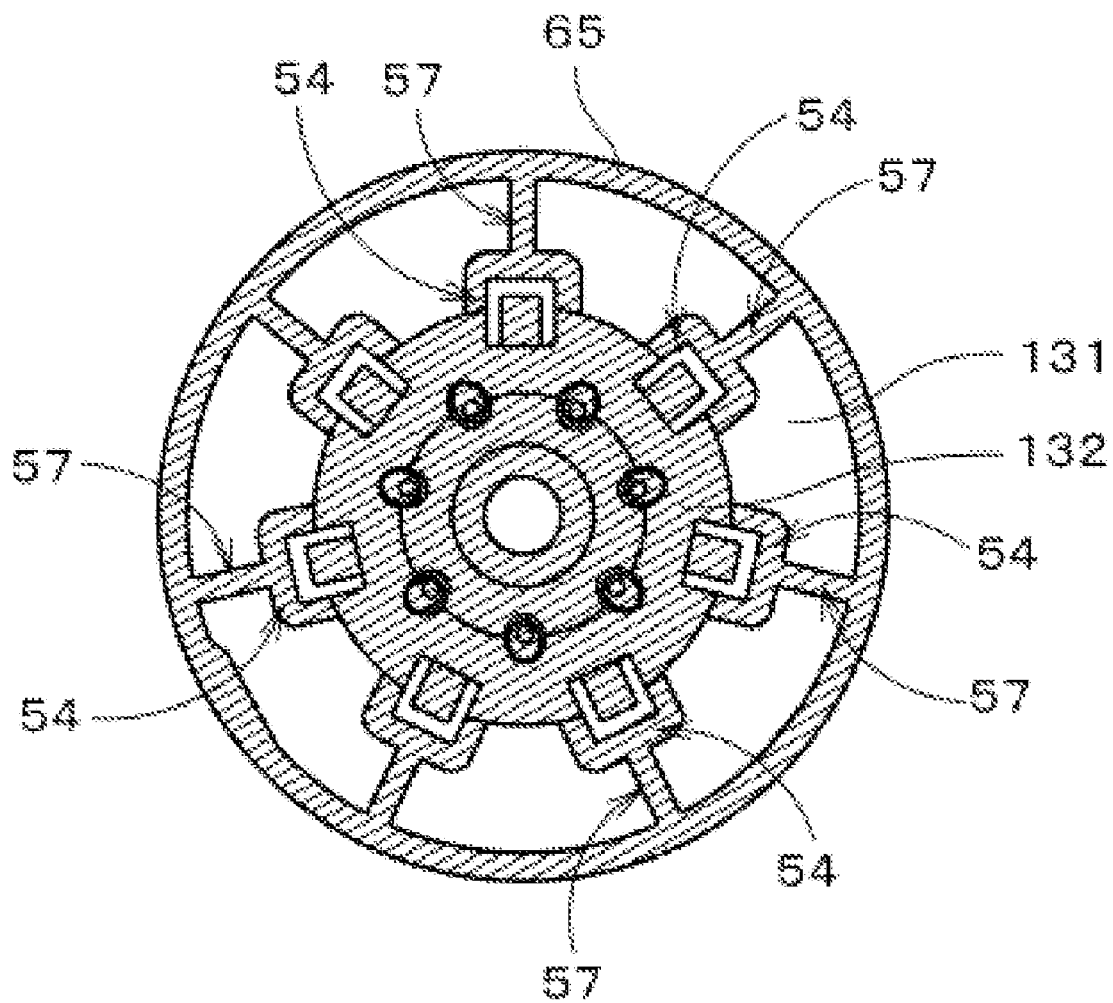
FIG. 17 is a top view showing a turntable.

The step of injection-molding the central resin member 132 can be the same as the corresponding step illustrated in FIG. 11. In the injection-molding step, the plate member 131 can be arranged within the molds in such a fashion as to leave a minute gap between the outer peripheral portion of the plate member 131 and the molds. Consequently, the resin layers 65 formed in the openings 54 can extend through the cutouts 57 and cover the outer peripheral portion of the plate member 131 as illustrated in FIG. 17.

In the injection-molding step, the first and second claw-forming parts 812 and 822 shown in FIG. 13 can be spaced apart from the edges 541 of the peripheral openings 54 over the entire peripheries thereof. This helps reliably prevent the first and second claw-forming parts 812 and 822 from physically interfering with the plate member 131. In the portion of the edge of the plate member 131 around the first and second claw-forming parts 812 and 822, a resin can be filled in the direction perpendicular or substantially perpendicular to the center axis J1. As a result, the entire inner surfaces of the claw position holes 66 can be defined by the resin. In other words, the inner peripheral surfaces of the claw position holes 66 can be spaced apart from the edge of the plate member 131 over the entire peripheries. In the direction perpendicular or substantially perpendicular to the center axis J1, the resin layers 65 can be formed between the edges around the claw position holes 66, i.e., the edges 541 of the openings 54, and the claw position holes 66.

In case of providing the plate member 131 as in FIG. 16, the edges and outer peripheries of the cutouts 57 can be covered with the resin. In the portion of the edge of the plate member 131 around the claw position holes 66 and the entire portion continuously extending from that portion, the resin can be filled in the direction perpendicular or substantially perpendicular to the center axis J1, thereby forming the resin layers 65. This helps minimize the contact between the molds and the plate member 131, which makes it possible to reduce wear of the molds and generation of foreign materials.

The resin is not necessarily be provided in the edge other than the peripheries of the claw position holes 66 so long as it has little influence on the first and second claw-forming parts 812 and 822. The portions of the resin layers 65 covering the outer peripheral portion of the plate member 131 can be removed in the subsequent step.

Figure 18:
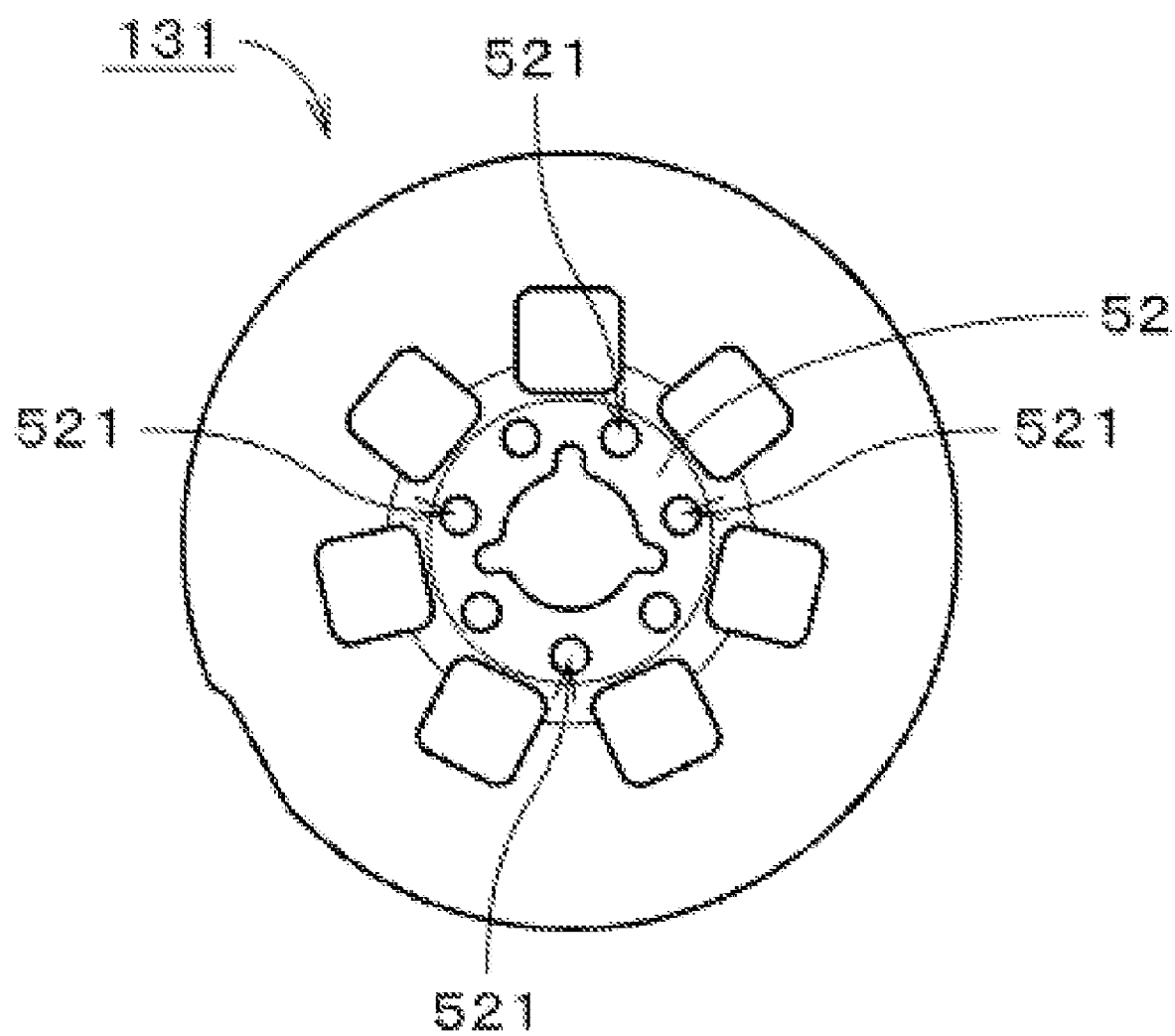
FIG. 18 is a top view showing a plate member of a still further example.

FIG. 18 is a top view showing a plate member 131 of a still further example. Seven hole portions 521 can be provided in the central plate portion 52 of the plate member 131 at the positions opposed to the gates 811a shown in FIG. 13. The support pins 823 can be omitted from the movable mold 82. When forming the central resin member 132, a resin can be injected toward the hole portions 521 from the gates 811a. Therefore, the central plate portion 52 is not strongly pressed by the resin stream, thus preventing deformation of the central plate portion 52. As a consequence, it is possible to prevent axial dislocation of the peripheral plate portion 51.

After the central resin member 132 has been molded as mentioned above, gate cut portions 634a can be formed as illustrated in FIGS. 5 and 7. The gate cut portions 634a can be opposed to the hole portions 521 in the direction parallel or substantially parallel to the center axis J1. Alternatively, the plate member 131 can be provided with cutouts in place of the hole portions 521.

(Second Preferred Embodiment)

Figure 19:
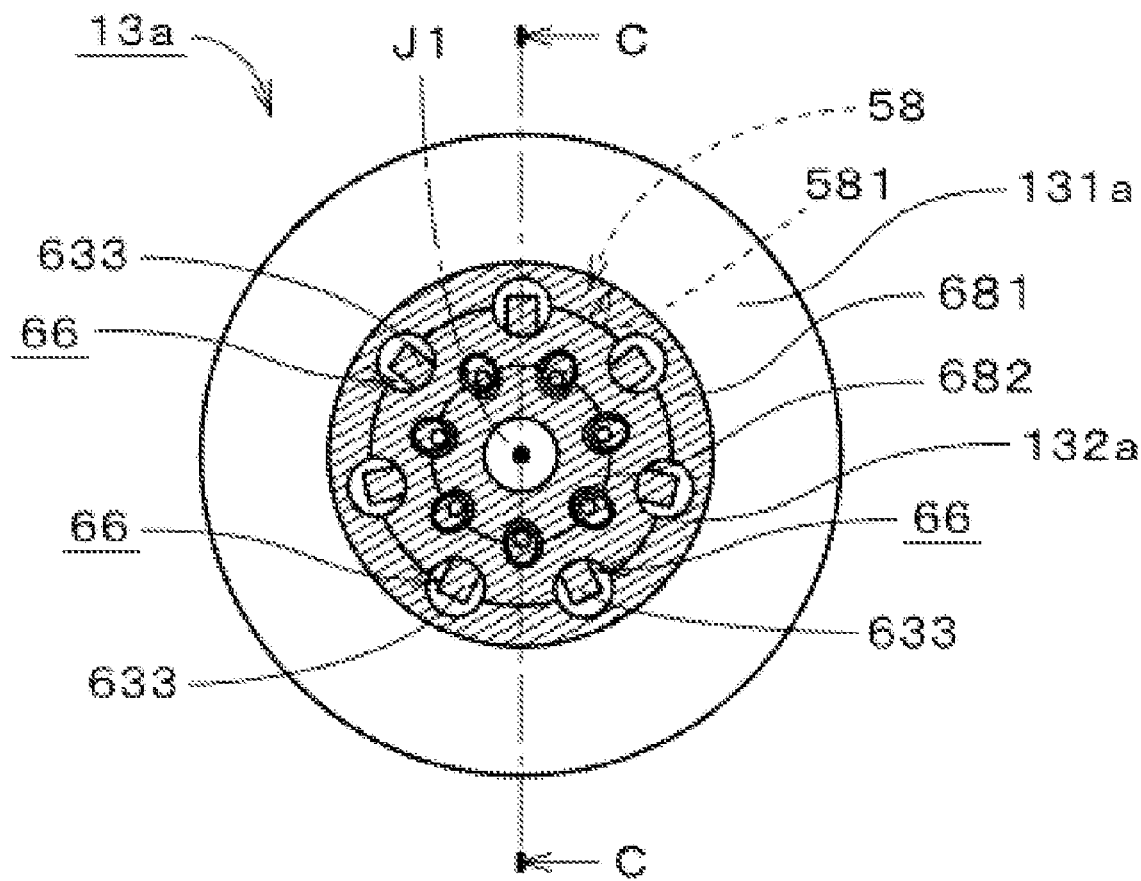
FIG. 19 is a top view showing a turntable according to a second embodiment.
Figure 20:
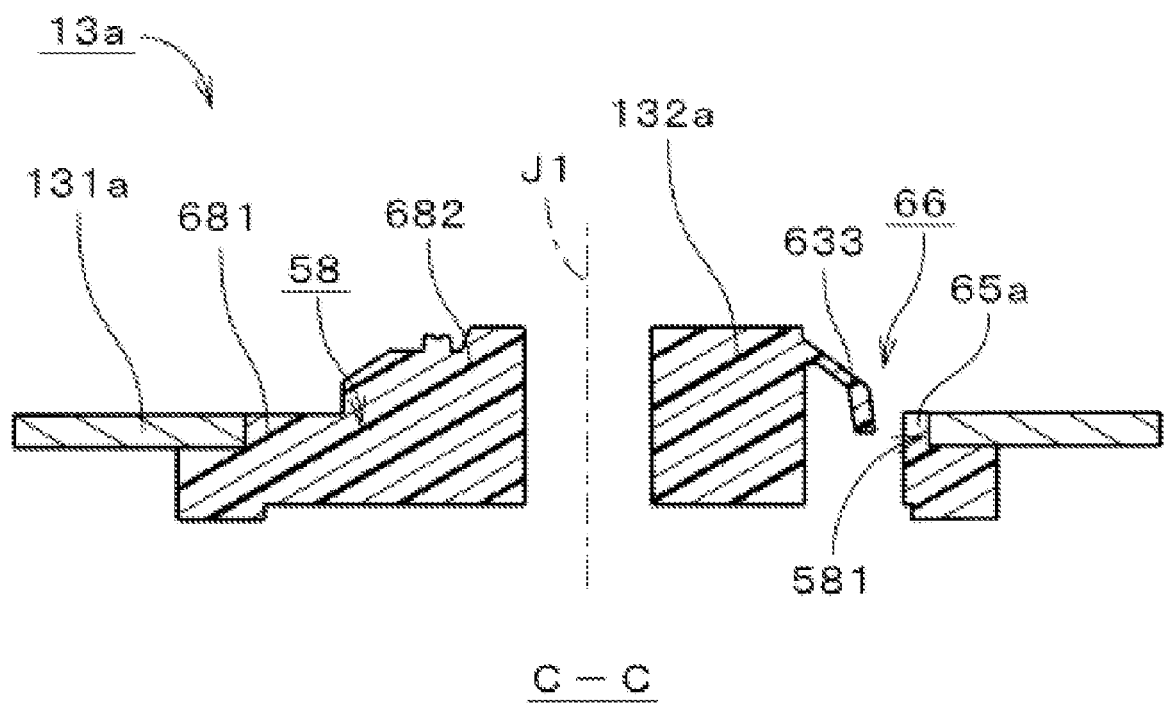
FIG. 20 is a sectional view of the turntable.

FIG. 19 is a view showing a turntable 13a according to a second embodiment. FIG. 20 is a sectional view of the turntable 13a taken along line C-C in FIG. 19. The turntable 13a can include a plate member 131a having an annular shape perpendicular or substantially perpendicular to the center axis J1. The plate member 131a can be said to be simpler in shape than the plate member 131 shown in FIG. 4. A central resin member 132a differing in shape from the central resin member 132 shown in FIG. 7 can be formed in the center of the plate member 131a by injection molding. In the following description, the same configurations as those of the turntable 13 of the first embodiment are designated by like reference numerals.

As shown in FIGS. 19 and 20, the central resin member 132a can include a resinous peripheral portion 681, a central ring portion 682 lying at the inner side of the resinous peripheral portion 681, seven claws 633 and seven claw position holes 66. The resinous peripheral portion 681 can cover the edge 581 of the large circular opening 58 of the plate member 131a. The central ring portion 682 can protrude upwards beyond the plate member 131a. The claws 633 can be arranged in the circumferential direction and extend radially outwards and downwards from the outer peripheral portion of the central ring portion 682. The claw position holes 66 can overlap with the claws 633 in the direction parallel or substantially parallel to the center axis J1 and also overlap with the opening 58 of the plate member 131a. The entire inner surfaces of the claw position holes 66 can be defined by the resin.

The process for manufacturing the turntable 13a can be the same as the process for manufacturing the turntable 13 as illustrated in FIG. 11. The support pins and the positioning pins can be omitted. As shown in FIG. 20, the claw position holes 66 can be formed in the central resin member 132a at the positions where the claw-forming parts substantially similar to the first and second claw-forming parts 812 and 822 are inserted. The claws 633 can be formed in the claw-forming spaces defined between the claw-forming parts. The inner edge of the plate member 131a can be covered with the resinous peripheral portion 681. Resin layers 65a are formed between the claw position holes 66 and the edge 581 of the opening 58. In other words, the resin layers 65a can extend in the direction perpendicular or substantially perpendicular to the center axis J1 and exist between the edge portion of the plate member 131a around the claw position holes 66 and the claw position holes 66.

In the second embodiment, the claw-forming parts can be avoided from contact with the opening 58 of the plate member 131a. This structure can reliably prevent the claw-forming parts from physically interfering with the plate member 131a.

While certain embodiments of the present invention have been described hereinabove, the present invention shall not be limited to these embodiments. The embodiments as described above can be modified in many different ways. In the first embodiment, for example, the tip ends of the claws 633 can be positioned above or below the claw position holes 66 as long as the claws 633 and the claw position holes 66 overlap with each other in the direction parallel or substantially parallel to the center axis J1, namely so long as the claws 633 and the claw position holes 66 overlap with each other when the central resin member 132 is seen in a top view. The number of the claws 633 can be two or any other number greater than two. The number of the claws 633 can be set equal to five through seven in order to reduce the influence of one damaged claw 633 on the remaining claws 633. The number of the positioning portions 551 can be two or any other number greater than two. Although the positioning portions 551 employed in the first preferred embodiment are in the form of cutouts, it can employ hole-shaped positioning portions. In the plate member 131 shown in FIG. 3, it is not always necessary that the claw position holes 66 and the openings 54 are equal in number, so long as there is provided a plurality of openings overlapped with the claw position holes 66.

There is no need for the upper surface of the central plate portion 52 to be fully covered with the resinous connector portion 632. A turntable of other shape can be employed, as long as the resinous cylinder portion 61 and the disk guide portion 631 are connected to each other by the resinous connector portion 632 at least in some regions on the upper surface of the central plate portion 52. Even in such an instance, generation of resin sinkage in the disk guide portion 631 can be prevented because the central plate portion 52 of the plate member 131 is positioned higher than the peripheral plate portion 51. In the central resin member 132, the upper portion 63 and the lower portion 64 arranged above and below the central plate portion 52 can be substantially equal to each other in thickness. However, the upper portion 63 and the lower portion 64 can differ in thickness from each other in case where deformation such as resin sinkage or the like occurs in the upper portion 63 and the lower portion 64.

When the central resin member 132 is injection-molded in the embodiments described above, the fixed mold 81 and the movable mold 82 can be clamped together in a state that the plate member 131 is attached to the fixed mold 81 rather than the movable mold 82. If the fixed mold 81 is provided with a mechanism for detaching the turntable, the movable mold 82 can be moved away from the fixed mold 81 with the turntable held by the fixed mold 81.

Figure 21:
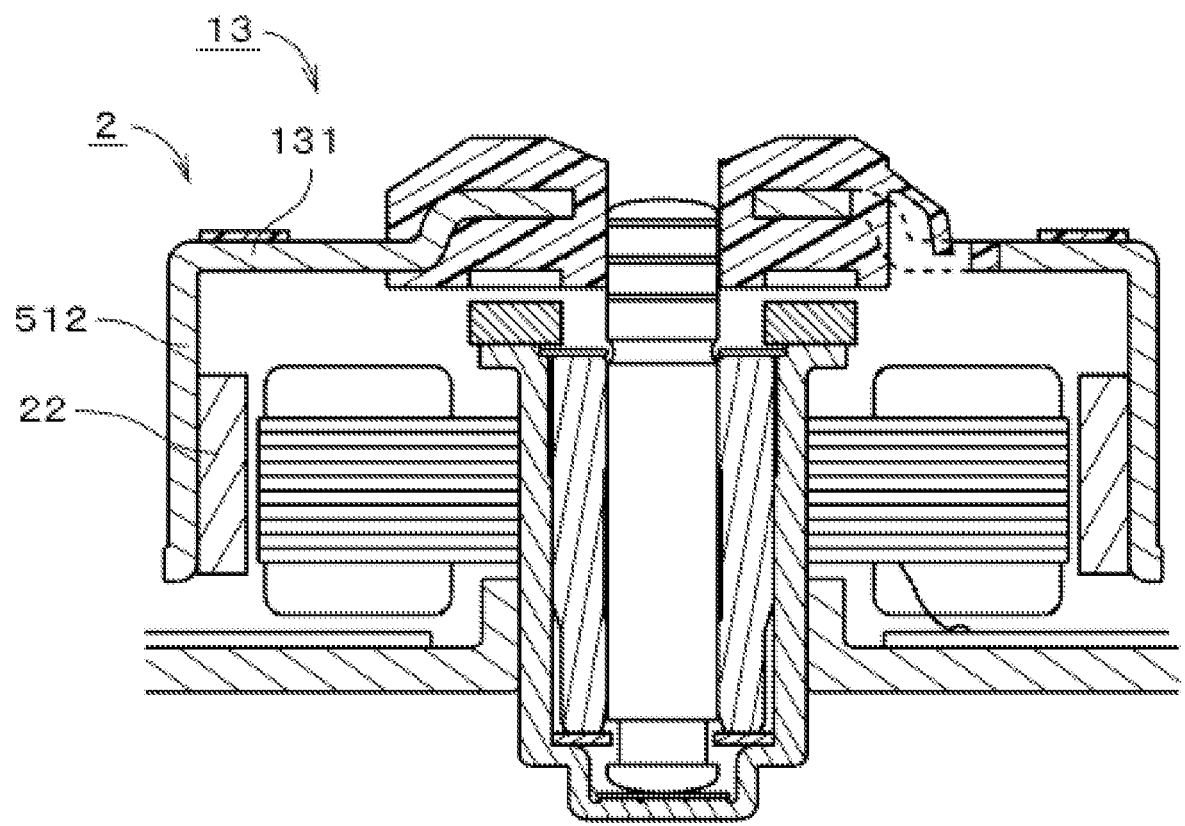
FIG. 21 is a sectional view of a motor, illustrating a plate member of a yet still further example.

In the first preferred embodiment, a cylinder portion 512 corresponding to the cup member 21 shown in FIG. 2 can be provided in the outer peripheral portion of the plate member 131 as illustrated in FIG. 21. In this case, the turntable 13 can be provided at the upper end of the rotary unit 2. The rotor magnet 22 is arranged inside the cylinder portion 512. The motor 1 may be mounted to other kinds of storage disk drive apparatuses such as a hard disk drive and the like.

The present invention can be used in various kinds of storage disk drive apparatuses.

While the embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A turntable for a storage disk drive apparatus, comprising:
   a plate member made of a ferromagnetic material; and
   a central resin member arranged at the center of the plate member and provided with an outer peripheral portion positioned above the plate member, the central resin member being provided into a single piece member by injection-molding a resin,
   wherein the central resin member comprises:
   a plurality of claws extending downwards from the outer peripheral portion;
   a plurality of claw position holes accommodating the claws in the direction parallel or substantially parallel to the center axis of the central resin member, each of the claw position holes including each of inner surfaces spaced apart from an edge of the plate member over the entire periphery of the plate member; and
   a plurality of outer ends, each of the outer ends provided outside each of the claws spaced by each of the claw position holes, each of the outer ends extending in the direction perpendicular or substantially perpendicular to the center axis, each of the outer ends existing between an edge of the plate member and each of the claw position holes.

2. The turntable of claim 1, wherein the plate member comprises a plurality of openings respectively overlapping with the claw position holes, each of the outer ends existing along the periphery of each of the claw position holes.

3. The turntable of claim 1, wherein the outer ends contacts the edge of the plate member around the claw position holes.

4. The turntable of claim 1, wherein the plate member comprises a single opening serving as said plurality of the claw position holes.

5. The turntable of claim 1, wherein the thickness of each of the outer ends in the direction perpendicular or substantially perpendicular to the center axis is in a range of from 0.5 mm to 1 mm.

6. The turntable of claim 1, wherein the claws comprises tip ends positioned within the claw position holes, respectively.

7. The turntable of claim 1, wherein the plate member is shaped by a press work.

8. The turntable of claim 1, wherein the plate member comprises a central plate portion having cutouts or hole portions, the central resin member including upwardly-indented recess portions, the cutouts or the hole portions including inner surfaces exposed to the recess portions.

9. The turntable of claim 8, wherein the recess portions are a plurality of positioning-pin recess portions formed by a plurality of positioning pins as a part of an injection-molding mold, the cutouts or the hole portions being a plurality of positioning portions arranged to fix the position of the plate member in the direction perpendicular or substantially perpendicular to the center axis.

10. The turntable of claim 9, wherein the plate member comprises a plate center hole, the positioning portions being a plurality of cutouts extending radially outwards from the plate center hole.

11. The turntable of claim 10, wherein the cutouts are three in number and are arranged such that the angle between the adjacent cutouts with respect to the center of the plate member is greater than 90 degrees.

12. The turntable of claim 9, wherein the plate member comprises cutouts formed in the outer peripheral portion thereof.

13. The turntable of claim 9, wherein the central resin member comprises an upper portion having a plurality of gate cut portions formed in an injection molding process,
   wherein the central resin member comprises a lower portion positioned below the plate member, the lower portion comprising a plurality of support-pin recess portions formed by a plurality of support pins making contact with the lower surface of the central plate portion in the injection molding process, the positioning-pin recess portions being alternately positioned between the support-pin recess portions.

14. A motor comprising:
   a stationary unit;
   a bearing mechanism;
   a rotary unit supported by the bearing mechanism, the rotary unit being rotatable with respect to the stationary unit; and
   a turntable for a storage disk drive apparatus provided at the upper end of the rotary unit,
   wherein the turntable comprises:
   a plate member made of a ferromagnetic material; and
   a central resin member arranged at the center of the plate member and provided with an outer peripheral portion positioned above the plate member, the central resin member being provided into a single piece member by injection-molding a resin,
   wherein the central resin member comprises:
   a plurality of claws extending downwards from the outer peripheral portion;
   a plurality of claw position holes accommodating the claws in the direction parallel or substantially parallel to the center axis of the central resin member, each of the claw position holes including each of inner surfaces spaced apart from an edge of the plate member over the entire periphery of the plate member,; and a plurality of outer ends, each of the outer ends provided outside each of the claws spaced by each of the claw position holes, each of the outer ends extending in the direction perpendicular or substantially perpendicular to the center axis, each of the outer ends existing between an edge of the plate member and each of the claw position holes.

15. A storage disk drive apparatus comprising:

a motor provided to rotate a storage disk;

a clamper for clamping the storage disk against the turntable, the clamper comprising a clamp magnet to attract the plate member;

an access unit to perform a task of reading information from the storage disk and/or a task of writing information on the storage disk; and a housing to accommodate the motor and the access unit, wherein the motor comprises:
- a stationary unit;
- a bearing mechanism;
- a rotary unit supported by the bearing mechanism, the rotary unit being rotatable with respect to the stationary unit; and
- a turntable for a storage disk drive apparatus provided at the upper end of the rotary unit, wherein the turntable comprises:
- a plate member made of a ferromagnetic material; and
- a central resin member arranged at the center of the plate member and provided with an outer peripheral portion positioned above the plate member, the central resin member being provided into a single piece member by injection-molding a resin, wherein the central resin member comprises:
- a plurality of claws extending downwards from the outer peripheral portion;
- a plurality of claw position holes accommodating the claws in the direction parallel or substantially parallel to the center axis of the central resin member, each of the claw position holes including each of inner surfaces spaced apart from an edge of the plate member over the entire periphery of the plate member,; and
- a plurality of outer ends, each of the outer ends provided outside each of the claws spaced by each of the claw position holes, each of the outer ends extending in the direction perpendicular or substantially perpendicular to the center axis, each of the outer ends existing between an edge of the plate member and each of the claw position holes.

* * * * *